(12) United States Patent
Fidrych

(10) Patent No.: US 9,775,328 B1
(45) Date of Patent: Oct. 3, 2017

(54) ATTACHMENT MECHANISM AND BOTTLE OPENER WITH STRAP OR COLLAR

(71) Applicant: Paul Fidrych, Portland, OR (US)

(72) Inventor: Paul Fidrych, Portland, OR (US)

(*) Notice: Subject to any disclaimer, the term of this patent is extended or adjusted under 35 U.S.C. 154(b) by 0 days.

(21) Appl. No.: 14/827,968

(22) Filed: Aug. 17, 2015

Related U.S. Application Data

(63) Continuation-in-part of application No. 14/524,375, filed on Oct. 27, 2014, now Pat. No. 9,179,648, and a continuation of application No. 12/648,240, filed on Dec. 28, 2009, now Pat. No. 8,869,654, and a continuation-in-part of application No. 29/529,147, filed on Jun. 4, 2015, now Pat. No. Des. 786,032.

(51) Int. Cl.
| | | |
|---|---|---|
| B67B 7/44 | (2006.01) | |
| A01K 27/00 | (2006.01) | |
| B67B 7/16 | (2006.01) | |

(52) U.S. Cl.
CPC .......... A01K 27/001 (2013.01); A01K 27/002 (2013.01); B67B 7/16 (2013.01)

(58) Field of Classification Search
USPC ........................................ 81/3.07, 3.09, 3.27
See application file for complete search history.

(56) References Cited

U.S. PATENT DOCUMENTS

| | | |
|---|---|---|
| D46,861 S | 1/1915 | Christi |
| 1,849,258 A | 3/1932 | Washburn |
| 1,853,889 A | 4/1932 | Alterson |
| 1,876,477 A | 9/1932 | Troendly |
| 1,988,890 A | 1/1935 | Fenton |
| 1,999,167 A | 4/1935 | White |
| 2,470,606 A * | 5/1949 | Dennison ............. A44B 11/005 24/178 |
| 2,710,999 A | 6/1955 | Davis |
| 3,137,907 A | 6/1964 | Unai |
| 3,393,433 A | 7/1968 | Barcus |
| RE26,754 E | 1/1970 | Fisher |
| 3,576,056 A | 4/1971 | Barcus |

(Continued)

OTHER PUBLICATIONS

Kurgo Wander Collar web-site, Dec. 10, 2009, www.kurgo.com/products/wcol.html, Author Unknown.

(Continued)

*Primary Examiner* — Joseph J Hail
*Assistant Examiner* — Shantese McDonald
(74) *Attorney, Agent, or Firm* — Wolff Law Offices, PLLC; Kevin Alan Wolff

(57) ABSTRACT

A combination strap or collar and bottle opener device that may be designed to have a short height and/or width and may include a combination attachment member and bottle opener. The bottle opener may be made in a number of different shapes, for example, a D shape (including D-ring), an oval shape, etc. A plastic quick-release coupling device may be included as a clasp system for selectively and releasably coupling two or more strap areas or ends together. The combination attachment mechanism and bottle opener may include a generally flat frame body having a first opening and a second opening, the first opening may be smaller than the second opening and may be separated by an intermediate or first linking member at a first end of the frame body, a second linking or cross member, and a third linking or cross member at a second end of the frame body.

20 Claims, 29 Drawing Sheets

(56) References Cited

U.S. PATENT DOCUMENTS

| | | |
|---|---|---|
| 3,760,464 A | 9/1973 | Higuchi |
| 3,775,813 A | 12/1973 | Higuchi |
| 4,135,267 A | 1/1979 | McKinney, Sr. et al. |
| 4,148,224 A | 4/1979 | Craig |
| 4,321,891 A | 3/1982 | Moeller |
| D266,479 S | 10/1982 | Hayakawa |
| 4,414,865 A | 11/1983 | Brooks et al. |
| 4,463,631 A * | 8/1984 | Barnes ............... B67B 7/16 7/151 |
| 4,810,102 A | 3/1989 | Norton |
| D302,140 S | 7/1989 | Johnston |
| 4,937,923 A | 7/1990 | McEntire |
| 4,967,622 A * | 11/1990 | Phillips ............... B67B 7/44 7/151 |
| 4,979,407 A | 12/1990 | Hernandez et al. |
| 5,088,160 A | 2/1992 | Warrick |
| 5,123,147 A | 6/1992 | Blair |
| 5,185,910 A | 2/1993 | Ziaylek, Jr. et al. |
| 5,247,905 A | 9/1993 | Arakawa |
| D363,257 S | 10/1995 | Anscher |
| 5,467,743 A | 11/1995 | Doose |
| D365,044 S | 12/1995 | Anscher |
| 5,474,033 A | 12/1995 | Mitchell, Jr. |
| 5,664,844 A | 9/1997 | Greene |
| 5,785,008 A | 7/1998 | Liu |
| 5,785,010 A * | 7/1998 | Koch ............... A01K 27/005 119/863 |
| 6,185,772 B1 | 2/2001 | Bates |
| 6,357,092 B1 | 3/2002 | Burrows |
| 6,460,746 B1 | 10/2002 | Amram |
| D471,678 S | 3/2003 | Hanna |
| 6,530,129 B1 | 3/2003 | Cheng |
| 6,880,490 B2 | 4/2005 | Hanna |
| D504,984 S | 5/2005 | Jones |
| D536,280 S | 2/2007 | Wemmer |
| D542,710 S | 5/2007 | Yoshiguchi |
| 7,237,292 B1 | 7/2007 | Endres |
| 7,263,750 B2 | 9/2007 | Keene et al. |
| D578,933 S | 10/2008 | Brown |
| D579,819 S | 11/2008 | Brown |
| D579,820 S | 11/2008 | Brown |
| D581,830 S | 12/2008 | Slabaugh |
| D603,753 S | 11/2009 | Palmer et al. |
| D623,030 S | 9/2010 | Spater |
| 7,904,997 B2 | 3/2011 | Foubert |
| 8,371,250 B2 | 2/2013 | Konovalov |
| D682,155 S | 5/2013 | Parsons |
| D698,503 S | 1/2014 | Fidrych et al. |
| D702,003 S | 4/2014 | Fidrych |
| 2005/0140331 A1 | 6/2005 | McQuade |
| 2006/0102102 A1* | 5/2006 | Bennett ............... A01K 27/002 119/792 |
| 2007/0034165 A1 | 2/2007 | Yang |
| 2007/0163393 A1* | 7/2007 | Ondeck ............... B67B 7/16 81/3.57 |
| 2008/0173135 A1* | 7/2008 | Beard ............... B67B 7/16 81/3.09 |
| 2010/0031897 A1 | 2/2010 | Moeller |
| 2011/0154955 A1 | 6/2011 | Fidrych |

OTHER PUBLICATIONS

BARK4BEER, Facebook Webpage, Nov. 28, 2009, 1 page.
Serena Zanello, "Product Design by Serena Zanello," http://www.coroflot.com/serenazanello/product-design.com, 27 pages.
American Eagle Outfitters web-site pages having unverified dates of Aug. 7, 2007, Jun. 12, 2008, Jan. 15, 2008, Mar. 21, 2008, Apr. 13, 2007 and Jun. 12, 2008, Author Unknown, 6 pages.

* cited by examiner

ATTACHMENT MECHANISM AND BOTTLE OPENER WITH STRAP OR COLLAR

This application claims priority to, and is a continuation-in part of, U.S. patent application Ser. No. 14/524,375, filed on Oct. 27, 2014, which claims priority to, and is a continuation of, U.S. patent application Ser. No. 12/648,240, filed on Dec. 28, 2009, now issued U.S. Pat. No. 8,869,654, which are hereby incorporated by reference for all purposes. This application claims priority to, and is a continuation-in part of, U.S. Design patent application Ser. No. 29/529,147, filed on Jun. 4, 2015, which is hereby incorporated by reference for all purposes.

BACKGROUND

This invention relates to the field of custom bottle openers generally, and more particularly to small and light weight bottle opener that may be attached to and cooperate to remove bottle cap(s) with a strap and/or a collar. The collar and/or strap may be used for small domestic animals, such as a dog or cat collar(s), harness, muzzle, leash extender, etc., and be capable of opening a bottler with the bottle opener that are well suited for and may be used in combination with a strap, collar, leash, etc.

Collars and straps have many different purposes and may be attached to, combined with, and/or used with various different items, e.g., a pet harness, leash, backpack, such that the present invention may have numerous different applications in practice, but may have important characteristics including being small, compact, and/or lightweight while still being effective at removing a bottle cap from a bottle or opening a bottle by enabling a user to pry a bottle cap off of a closed bottle (e.g., a soda or beer bottle), regardless of what the bottle opener may be attached to. For example, with domesticated small animals, such as dogs and cats, the dogs or cats may wear, for example, a collar(s) and/or strap(s) (e.g., part of a dog or cat harness) coupled to them. Further, such pet collars and harnessed may serve both a functional and aesthetic purpose for the owners of the pets and the pets themselves. A collar may also provide a means for connecting a leash to the animal. Often the collar may include, for example, a D-ring to facilitate the selective coupling of a leash to the collar to control or walk the pet. The D-ring may also serve as a hanging device for attaching, for example, an identification tag. In any case, regardless of the application, the bottle opener may be attached to something.

Far-removed from the art of animal collars, bottle openers were developed to open a variety of bottles, including those with caps that are crimped to seal in the contents, whether it be beer, soda, or other liquids. Openers are available in many different designs, including hand held, wall mounted, vending machine mounted, as well as other styles.

The incorporation of a bottle opener into a device that can be worn on a person is known. For example, U.S. Pat. Nos. 6,185,772 and 4,135,267 describe belt-buckle bottle openers. One attempt to combine a dog collar with a bottle opener is a collar sold under the brand name of Wander Collar by Kurgo available at www.kurgo.com. However, these known devices have several shortcomings: Specifically, the combination belt and bottle opener are generally difficult to use because the bottle-prying feature aligns perpendicular to the long-axis of the belt. Thus, when attempting to open a bottle while worn, the opener causes the belt to twist and this twisting makes opening the bottle difficult or impossible. Further, this twisting is uncomfortable to the wearer. In other devices, the entire belt must be removed for the belt-buckle opener to function as an opener—this is often impractical so such devices are worn as a gag or statement, and fail to work as a utilitarian bottle opener and belt. The Kurgo Wander Collar has many shortcomings in addition to the similar shortcomings just discussed relative to belt-bottle openers. For example, the Wander collar has many sharp crags and edges that can catch on articles and can readily cause injury to the dog or person handling the dog and because of the alignment of the pry-hook, it too is difficult to use as an opener when worn as a collar as there is insufficient space to grip the opener when worn on the dog's neck and there is no resistance provided by the collar due to the orientation of the opener relative to the collar.

Yet another problem not contemplated in the art of dog collars and generally overlooked in human apparel is the amount of human-generate scrap material that ends up in land fills and is otherwise wasted and adds to the global green-house gas production and increases humankind's carbon footprint. Therefore, there is a need to re-use and/or reclaim any portion of this scrap to reduce the environmental impact new products, including dog collars, cause. One overlooked solution is to re-use discarded rubber products, such as bicycle inner tubes, which are particularly difficult to dispose as they do not quickly degrade or deteriorate, and due to the high petroleum content, pose a serious risk of fire, smoke and air pollution if left in scrap piles. Further, butyl rubber cannot be recycled with other plastics or household waste. The relative low cost of virgin-raw material makes traditional recycling cost prohibitive.

Yet another problem with existing dog collars, which are typically constructed of either leather or nylon, is the time required for the collars to dry after becoming wet. This often causes the material to deteriorate, allow bacteria to grow and become malodorous.

Accordingly, there remains a need for an improved bottle opener designs that may be used in combination with, for example, pet collar(s) and/or straps attached to various items, particularly where the bottle opener is designed so that improves upon the current art and has improved performance in opening a bottle and/or size or profile. Other areas of improvement may be, for example, a collar should use recycled material to reduce the environmental impact on the planet. Further, such a device should be operable as a bottle opener when worn without causing distress or pain to the wearer. Also, such a device should be free from sharp edges and crags, but may also serve as a means for hanging an identification tag and/or as a coupling member or attachment member to attach or link another item to it, for example, for attaching a leash to a collar, a harness, a leash, or any other item useful in the particular application. Further, in the case of, for example, a collar, the collar should be made of materials that will dry quickly, resist odors, and be soft and comfortable to wear.

SUMMARY OF THE INVENTION

The present invention overcomes the limitations of the prior art and contemplates in part a domestic animal or pet collar, for example a pet dog collar, that may include, for example, a combination leash attachment member and bottle opener. In various embodiments the attachment member may be any one of a number of geometrical shapes which may include a bottle opener. The attachment member may have two openings, for example, a first smaller opening for having a collar or strap inserted into for attaching the attachment member to the strap or collar and a second larger opening for removing a bottle cap from a bottle and attaching other items to such as a leash and/or pet identification (I.D.) tag. In various embodiments the combination attachment member and bottle opener may be a leash attachment member that may be, for example, a combination D-ring and bottle opener. The combination D-ring and bottle opener serves much as a conventional D-ring, enabling a secure means for coupling the collar to a leash and for hanging an I.D. tag, but also serves as a bottle opener without requiring removal of the collar or opener from the pet's neck to use it as a bottle opener. The leash attachment member in various embodiments may be made in a shape such that it does not extend much beyond the strap or collar it is attached to, i.e., it may be made as a low profile design, and it may be shaped so that it does not have any protruding surfaces that will catch on things that a pet may encounter on a regular basis.

Further, the present invention contemplates a collar consisting of a two-ply material; one ply consists of reclaimed bicycle inner tube rubber, the second ply consists of a hydrophobic material such as nylon or polyester. The combination of a stretchable material (rubber) and a non-stretch material (nylon or polyester) attached with interlocking stitching results in a laminate that has a controlled amount of stretch. The amount of stretch can be varied by changing the length and tension of the interlocking stitch. The use of small, controlled amount of stretch adds a cushioning element to the collar and reduces the force on the dog's neck from a leash. Because the force felt by the animal around the neck is a function of the mass of the collar and leash times the acceleration, a reduction in acceleration due to a stretch or resiliency designed into the collar due to the spacing of the stitching and ply materials results in a corresponding reduction of the force on the dog's neck. This results in a collar that is comfortable for the dog to wear, resists fraying of the edges, is quick-drying, and resists odors.

Other features and advantages contemplated may include: An adjuster or slider for adjusting sizing of the collar without creating a loose collar end; A bottle opener with features to enable simultaneous use as a bottle opener and hold an I.D. tag, and hold a leash clasp, while still being worn around a dog's neck;

The combination D-ring and bottle opener couples to the collar in a way to allow movement parallel with the webbing of the collar;

The dog collar D-ring bottle opener can be used to tie, clasp, or attach a leash to the dog collar in a way that collar/leash attachment point can withstand considerable force;

The smooth rubber surface of the inner ply of the collar will not catch or pull dog's fur; The D-ring/bottle rotate substantially about 180-degrees around the center point of the attachment point on the collar to the bottle pry feature to arrange along the long-axis of the collar so that the collar need not be removed to be operable as a bottle opener; and The D-ring bottle opener may include a formed loop (prying point for the bottle cap) at the center point of the D-ring.

In various embodiments the combination attachment member and bottle opener may be made in various geometrical shapes that may include, for example, a combination D-ring bottle opener with a pry hook extending into the second opening from either of two cross members, the cross member shared between the first and second openings or the opposite cross member or the cross member not shared between the first and second openings. Another geometrical shape may have a pry hook that does not extend into the second opening that is integrated into one of the cross members. A still further variation or embodiment may have the second opening be shaped generally as a circle or oval.

An even further embodiment may include having a pry hook that extends outward from the general plane of the main cross members and/or width.

In various embodiments, the bottle opener may be attached to one of many types of items other than a pet collar or strap. For example, the bottle opener may be attached to a muzzle, leash extender, harness, back pack, life vest, life preserver, recreational floatation device (e.g., inner tube or floatation ring), belt as a belt loop, etc. The combination bottle opener and attachment mechanism for attaching various items such as a leash, pet ID, rope, badge, string, etc. may be made small, compact, low profile, etc., such that it is a unique bottle opener design which may be low profile or smaller than typical bottle openers and which allows it to be used to open a bottle without the need for removing a collar or strap that it is attached to from its intended location (e.g. around the neck or body of a pet).

As one skilled in the art would appreciate the summary provided above is intended to give some of the highlights of the present invention and is not intended to be limiting to the present invention. A number of exemplary embodiments are provided below which better describes more of the invention including how to make and use the invention.

DRAWINGS

Figure 18:
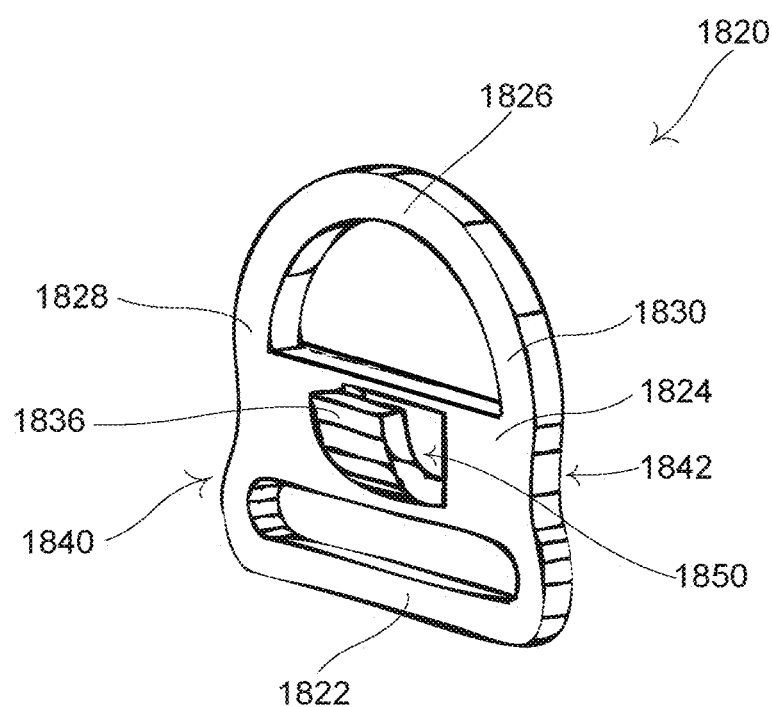
FIG. 18 is a perspective view of an even further embodiment of the present invention including a attachment mechanism or D-ring and bottle opener, according to an at least eighth preferred embodiment of the present invention.
Figure 28:
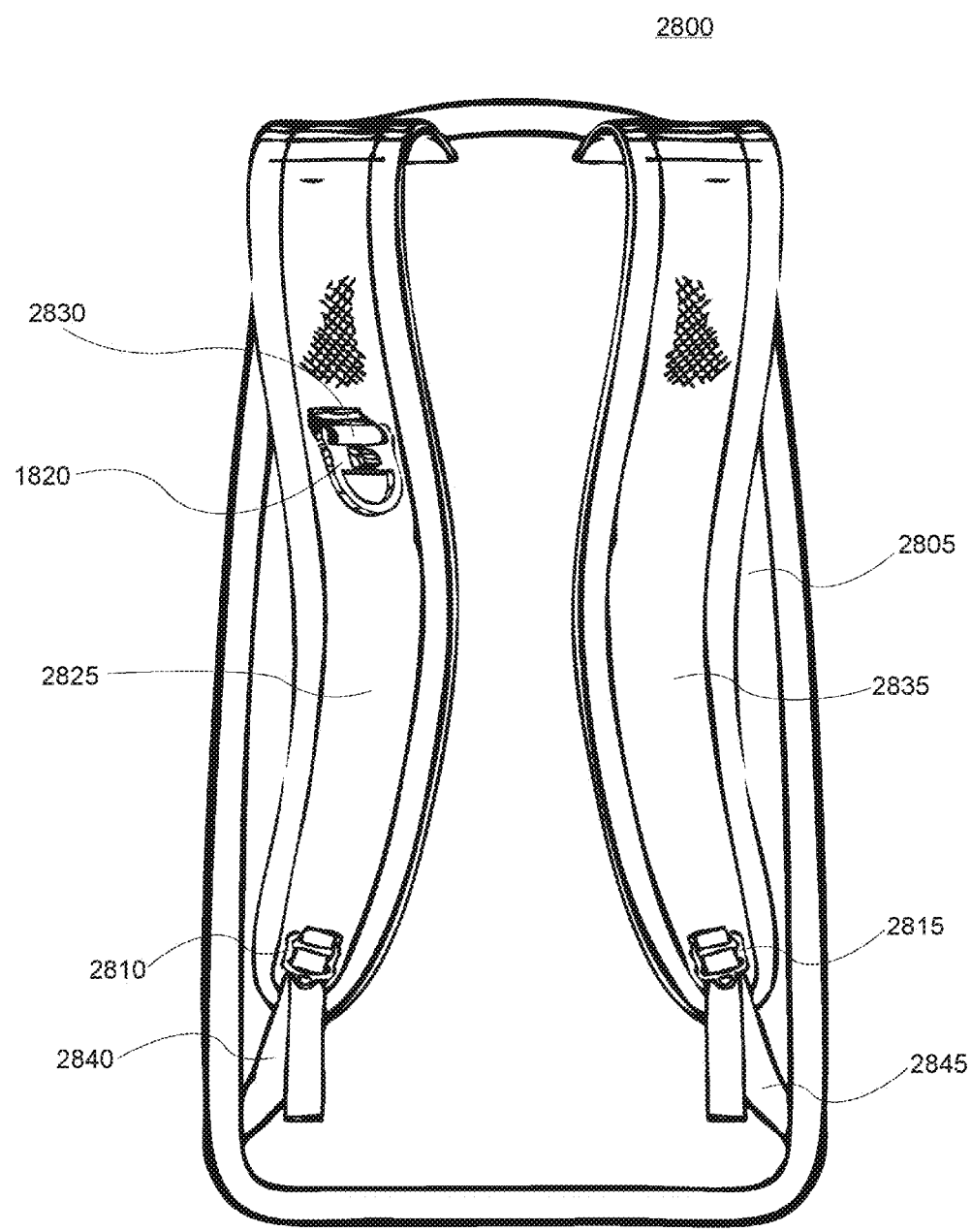
Figure 29:
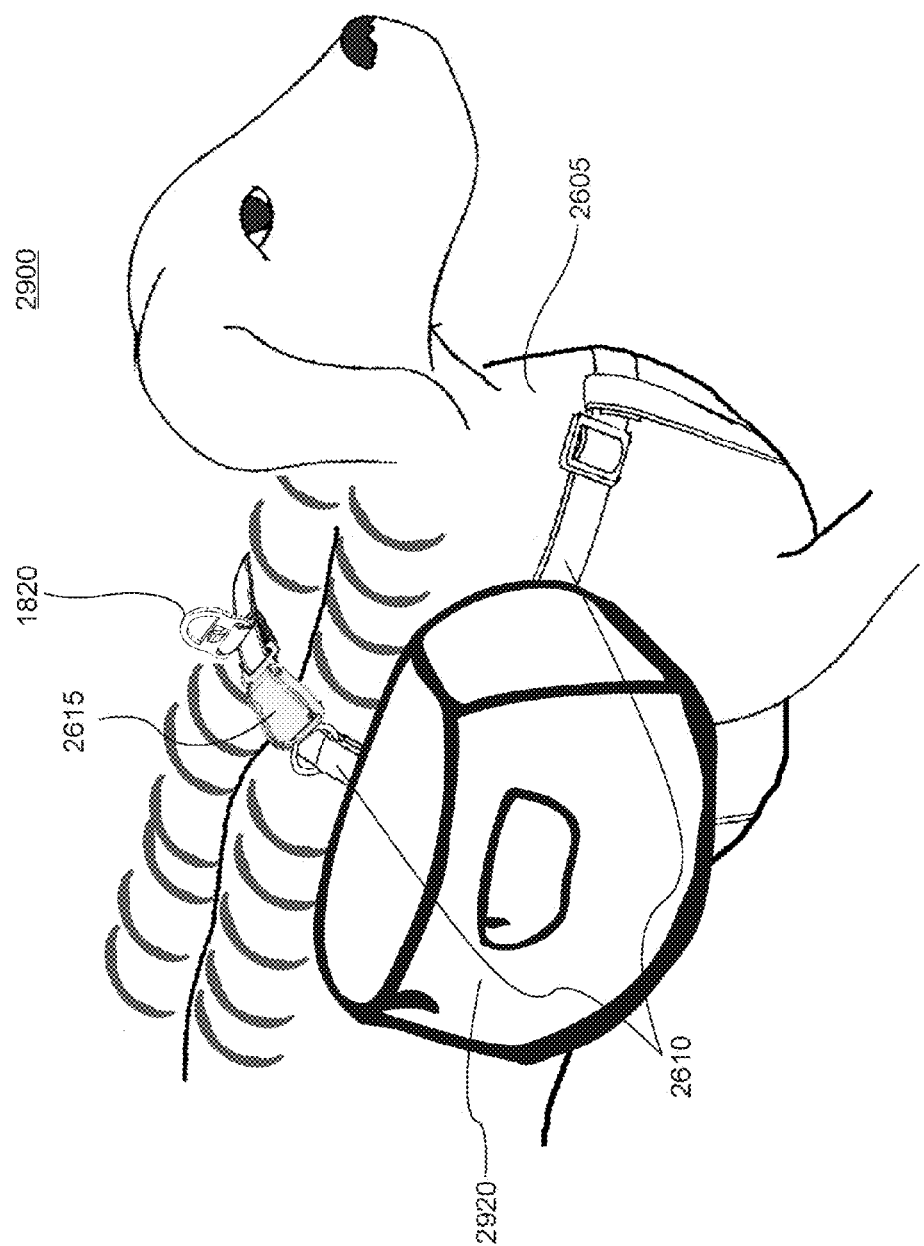

FIG. 28 is a perspective view of an embodiment of the present invention including the attachment mechanism and bottle opener of FIG. 18 attached to a back pack, according to a preferred embodiment of the present invention; and FIG. 29 is a perspective view of an embodiment of the present invention including the attachment mechanism and bottle opener of FIG. 18 attached to a harness with a buckle portion and side or back pack, according to a preferred embodiment of the present invention.

One skilled in the art will appreciate that the figures listed above and presented in the present patent application are intended to be exemplary embodiments so as to give a good understanding of the present invention, but are not intended to be limiting to the present invention. One skilled in the art would understand that various minor modifications of the present invention are possible and that the invention should be limited to the exact exemplary embodiments shown in the figures and described herein, rather the invention should be limiter only by only the claims of the present patent application.

DESCRIPTION OF THE INVENTION

Some of the possible preferred exemplary embodiments will now be described with reference to the drawings in the Figures that are listed above. However, those skilled in the art will understand that alternative configurations and combinations of components may be substituted without subtracting from the invention. Also, in some figures certain components may be omitted to more clearly illustrate the invention.

Figure 1:
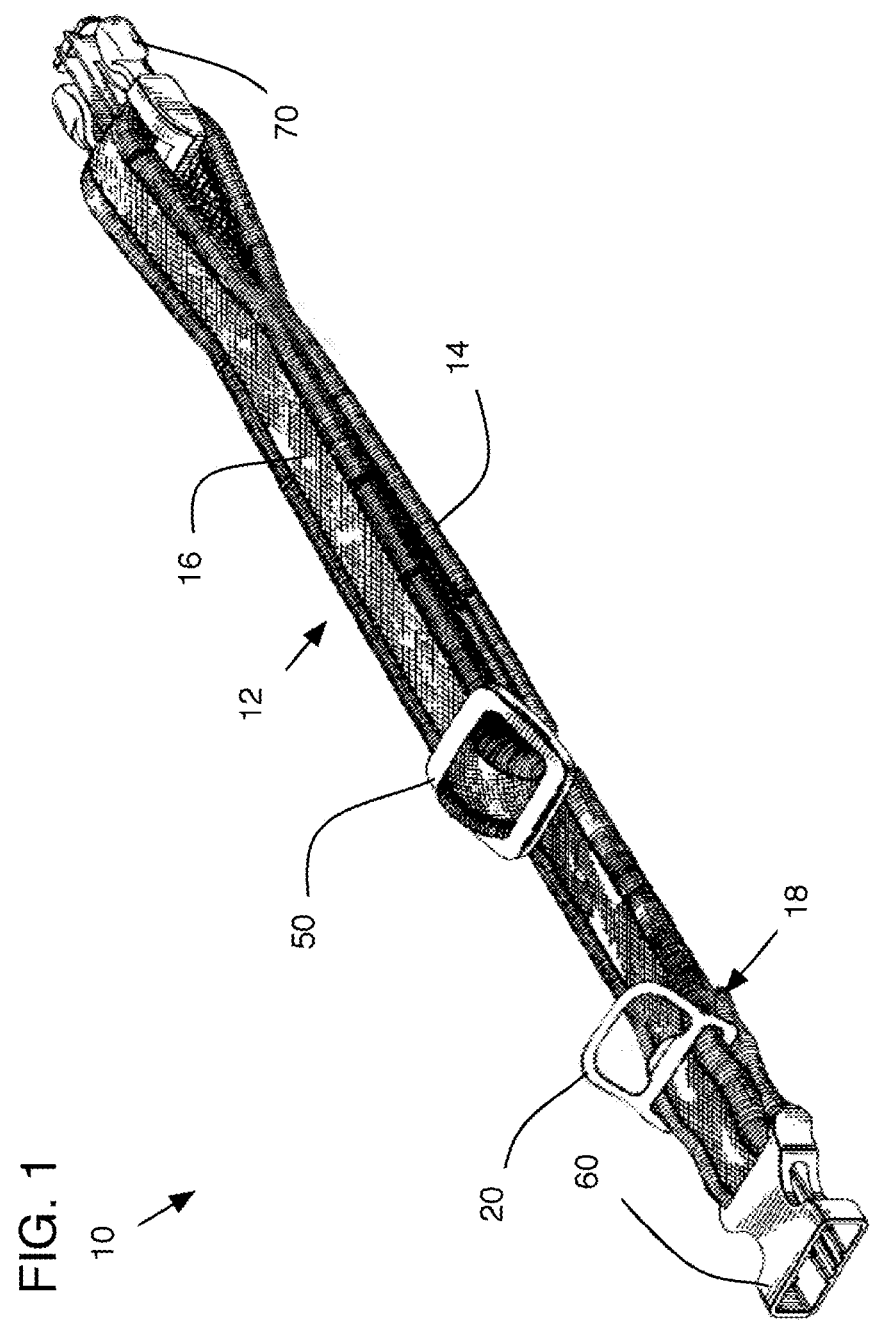
FIG. 1 is an offset top view of a first preferred embodiment according to the present invention.

A first preferred embodiment of the present invention, as FIG. 1 illustrates, contemplates a combination collar and bottle opener device 10 for a small domestic animal, such as a pet dog, comprising a strap 12 with an industry standard plastic quick-connect coupling clasp system. The clasp system includes a female receptacle 60 adjacent to a strap first end 18 whereby a portion of the first end loops through a supporting member, provided by the female clasp end for this purpose, and doubles over itself and is coupled by known means, such as mechanical fastening by a thread interwoven between the overturned flap end, as would be commonly understood in this art. Also adjacent to this first end 18 is a combination D-ring and bottle opener 20.

The strap 12 further includes a strap second end 19 (see, e.g., FIG. 2) coupled to an adjuster 50 (also called a slider). FIG. 3 better illustrates this well-understood adjuster 50 for adjusting the overall length of the collar strap 12. The second end 19 of the strap wraps around an intermediate support 56, which is designed for this purpose, and the end 19 overlaps itself and is mechanically fastened by interwoven thread. An intermediate portion of the strap alternates under the first leg 54, passes over the intermediate support 56 and continues under the second leg 58. Each leg 54 and 58 and intermediate support 56 are generally arranged parallel to each other and supported by a generally rectangular frame body 52.

The device 10 further includes a mating male connector end 70 slideably coupled to the strap at a second intermediate portion. Thus, as the adjuster 50 increases or decreases the overall collar strap length, the male connector 70 moves and rotates relative to the strap portion passing through it. The male connector includes support features to enable this and is well understood in this art. One exemplary clasp system that is well suited to this first preferred embodiment of the present invention includes a clasp by ITW Nexus, of Des Plaines, Ill., USA, as model number C-25, for instance.

Figure 2:
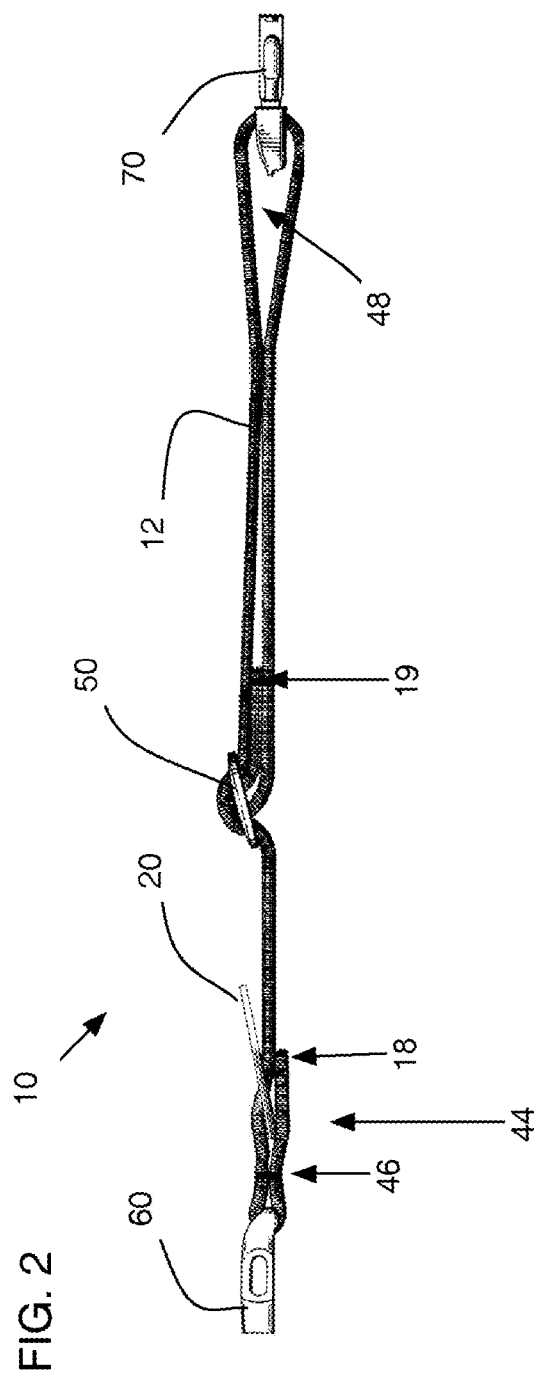
FIG. 2 is a front view of the embodiment of FIG. 1.
Figure 3:
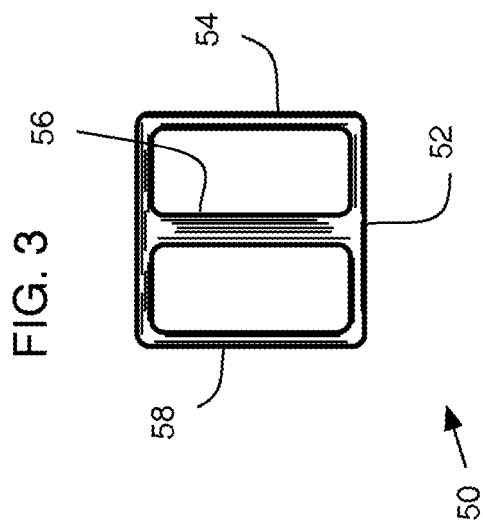
FIG. 3 is a detail top view of an adjuster, a component 5 of the preferred embodiment of the present invention.

FIG. 2 shows a front view of the device 10 according to the first preferred embodiment of the present invention. In this view, the two ply strap 12 includes a female end 60 of a plastic quick-connect coupling mechanism. Immediately adjacent to this portion of the clasp system, the combination D-ring and bottle opener 20 arranges in a slot 44 formed by the overlapped and folded first end 18. The combination ring and opener 20 is prevented from sliding the entire length of the strap by means of a first seam 46 running perpendicular to the long-axis of the strap and a second seam 45 that also captures the proximal end of the first end 18. This seaming feature and slot 44 may be better appreciated in FIG. 5. This slot, importantly, is of sufficient width to allow the combination D-ring and bottle opener 20 to rotate about 180-degrees so it may lie flat coincident with strap in either direction of facing the male end or female end of the strap clasping system. This feature allows the combination D-ring and opener to function as a bottle opener while at the same time being worn by a pet dog. That is to say, that the collar need not be removed from the animal for it to function as a bottle opener. FIG. 2 also shows a region or pocket 48 adjacent to the male quick connect 70. This area enables the male end to pivot and slide relative to the strap, which thereby enables the male coupler to maintain the appropriate orientation relative to the female coupler regardless of the affective length of the collar.

Figure 4:
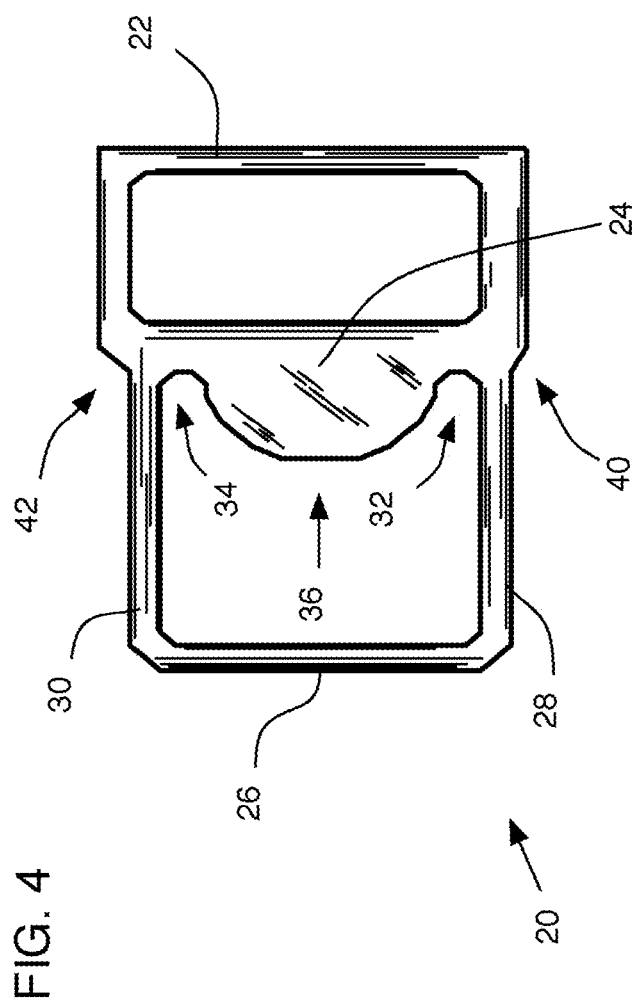
FIG. 4 is a detail top view of a combination D-ring and bottle opener according to the first preferred embodiment of the present invention.

FIG. 4 details the combination D-ring and bottle opener 20 of the first and second preferred embodiments of the present invention. In this top view, the combination D-ring and bottle opener 20 is a flat rectilinear body having a first (upper) arm 30, with intermediate shoulder feature 42, extending horizontally and a second (lower) arm 28 arranged generally parallel to the first arm and also including its own intermediate shoulder feature 40. The arms are separated by three linking members; at the proximal end of the arms a first linking member 22, and at the distal end a second linking member or hinge bar 26, and an intermediate linking member or pry hook 24 midway between the other two links. The first linking member 22 and first upper arm 30 and the intermediate link 24 and the upper arm 28 form a void. This void receives the two-ply strap 12 (as better illustrated in FIG. 5). The intermediate link 26 is of sufficient size to enable a logo or other mark to be affixed thereon for marketing or promotional or other purposes. The corners of the opener 20 are rounded and the edges smoothed to prevent catching fur or cutting tissue. Of particular note, the grooves 32 34 and radiussed pry feature 36 are smooth, arcuate and radiussed edges that flow into each other without any sharp features.

This D-ring and bottle opener 20 further includes a bottle-opening portion consisting of the intermediate link (pry hook) 24 and hinge bar 26. The radius 36 forms a bottle pry for inserting under the lip of a crimped on bottle lid and the second linking member 26 forms the hinge bar that passes over the top of the bottle lid so that a downward rotation of the opener 20 relative to the bottle lid forces the bottle pry region 36 to lift up the overhanging portion of the crimped on lid, while the hinge bar 26 restricts relative movement of the lid, thus forcing it open—as would be well understood in this art. Importantly, the bottle-opening side of the intermediate linking member or pry hook 24 includes a first groove 32 and second groove 24. The importance of these grooves is better understood in relationship to FIG. 5.

Of particular note in this preferred embodiment, the hinge bar 26 and pry hook 24 lie in a common plane and encircle a void suited for clipping a leash; thus, the hinge bar also serves as an attaching point for a leash or collar I.D. tag. Moreover, all three linking members (pry hook 24, hinge bar 26, and first linking member 22) all lie in this first common plane. Because the collar inserts between the intermediate pry hook 24 and the first member 22, there must be sufficient slack in this void to allow the entire combination bottle opener 20 to rotate to lie flat relative to the collar in one direction and rotate 180-degrees to lie relatively flat on the collar in the opposite direction. This results in the combination ring 20 to lie flat on the collar with the long axis of the combination ring 20 coinciding with the long axis of the collar. Further, this orientation of the combination ring 20 results in the long axis of the pry hook 24 being arranged perpendicular to the long axis of the collar. This feature allows the bottle opener portion of the combination 20 to function as a bottle opener without needing to remove the collar from the dog.

Figure 8:
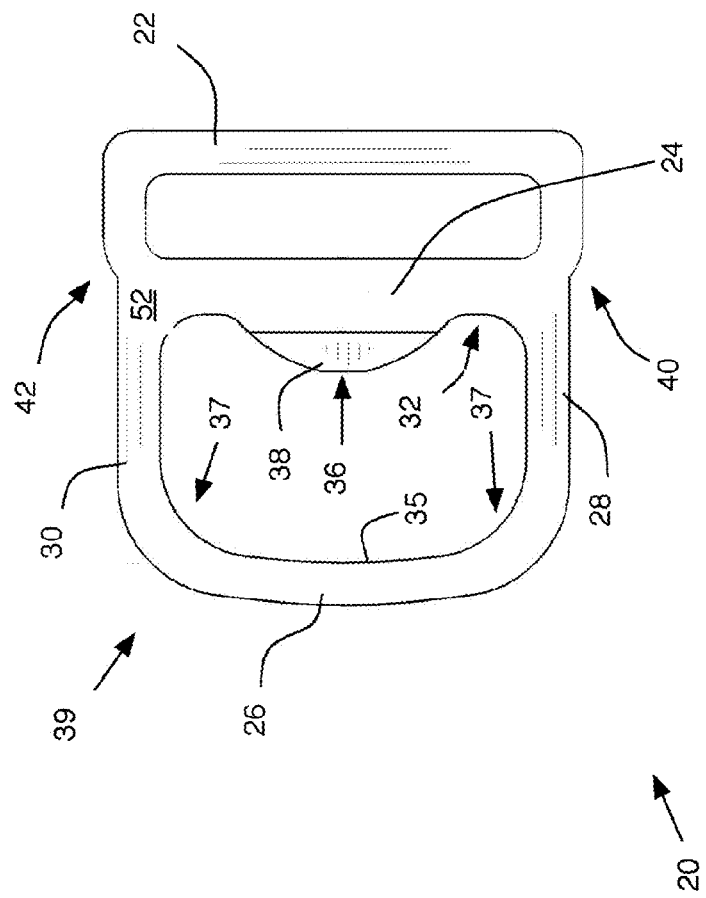
FIG. 8 is a top view of an alternative combination D-ring and bottle opener according to a second preferred embodiment of the present invention.

A second preferred embodiment of the combination D-ring and bottle opener 20, as FIG. 8 illustrates, includes gentle-rounded corners and smooth curves. The combination D-ring and bottle opener 20 consists of a frame body 52 having an overall thickness of approximately about 2 mm, overall length of about 33 mm, opener/bottle cap area of about 27 mm wide by about 17 mm in length. The prying flange 38 has a length of about 8 mm and an accessory loop 25 detent area 32 about 4 mm. In this preferred embodiment the material is steel. In these preferred embodiments the combination D-ring and bottle opener 20 is fabricated in a stamping operation, then put through a hardening process. Surface finishing is done through hang-up plating with a rust inhibiting coating. Although in this preferred embodiment the opener 20 is coated with a rust inhibiting material, other contemplated embodiment include using aluminum or stainless steel—some dimensions would be understood to be modified to provide the sufficient strength required to prevent the opener 20 from bending when applied to open a bottle. However, in this preferred embodiment, the design has been optimized to create the shortest overall length, as well as shortest standoff height (length that D-Ring stands off of collar), while still allowing operation of opening a bottle. Although the combination opener/D-ring would work better as a bottle opener in a longer length, this would result in an increased probability that the metal would snag on the dog's fur. And a shorter design, although less-likely to snag, would be inoperable as an opener as the opening force would be impractically high.

The width of arms 30 and 28 are optimized—small enough so that a leash clip can freely rotate around it and slide along it along with the inside radius 37 (which is smaller than the corresponding outside radius 39), yet thick enough to provide a stable platform for bending the bottle cap without causing permanent deflection of member 26. Edge 35 has a very large radius so that it is slightly curved. As a bottle opener, this edge 35 needs to be straight to ensure proper opening of a bottle, but as a clip for a leash it needs to be radiussed to ensure that the leash clip moves to the geometric center of the combination opener/clip 20 when used as a clip to hold a leash. This edge, therefore, needs to cause the leash to move to center, otherwise the leash will cause the opener 20 to twist when worn by the dog and the dog pulls. This can injure the dog.

In the various preferred embodiments, two lockstitches, one on each edge running parallel to each other, holds or couples the first and second ply, which include a top or first ply material such as nylon, hemp, leather, bamboo webbing or other material and the re-claimed rubber (second ply or bottom material). Each lockstitch uses two threads, one passed through the needle and one coming from a bobbin or shuttle. Each thread stays on the same side of the material being sewn, interlacing with the other thread at each needle hole. The optimum thread weight is 92 oz polyester, with a hole spacing of about 4.5 mm.

Figure 5:
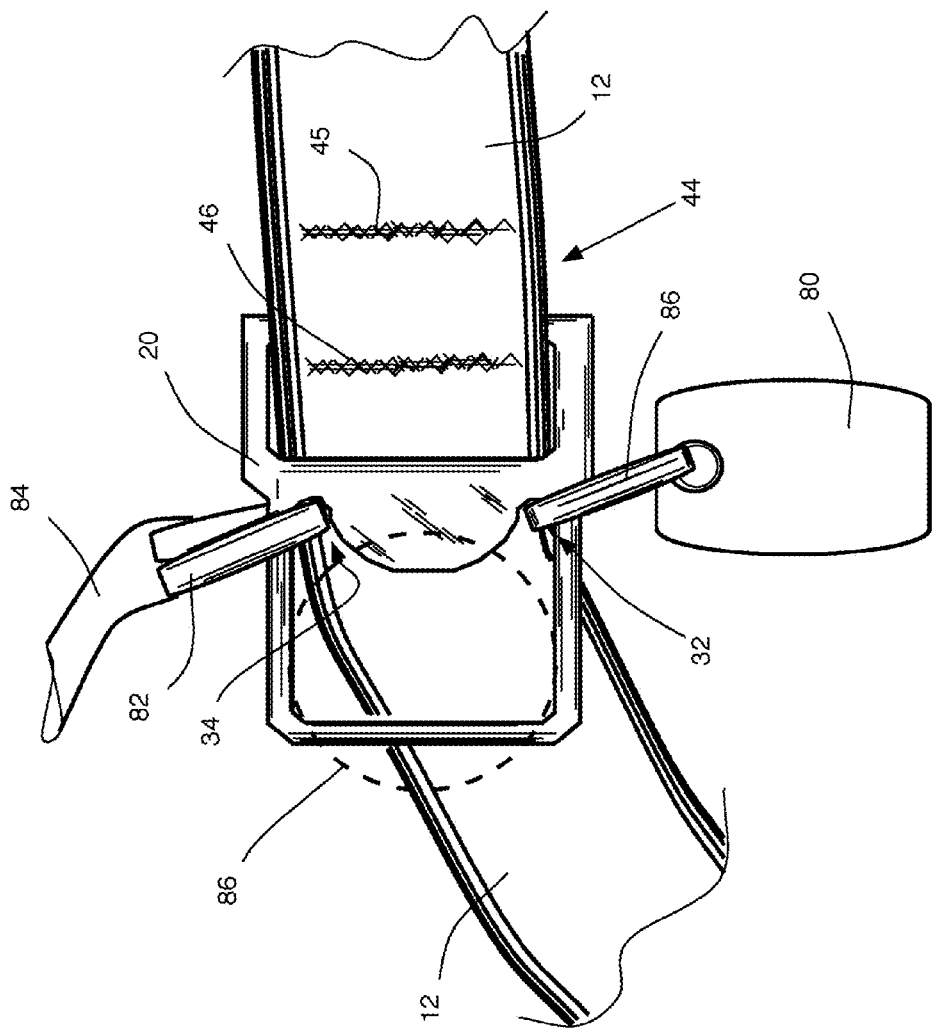
FIG. 5 is a detail top view of the first preferred embodiment highlighting the combination D-ring bottle opener in relation to the strap.

FIG. 5 shows the device of the present invention, a combination dog collar 10 with a combination D-ring and bottle opener 20 having a strap 12 with a specially formed slot 44 adjacent to the first end 18 (not shown in FIG. 5). This slot is formed by two seams stitched perpendicular to the long axis of the strap 12; a first seam 46 and second seam 45. This slot captures the first linking member 22 of the combination D-ring and bottle opener 20 (as better understood in FIG. 4). Grooves 32 and 34 are important because they allow a linking ring 86 (for example, holding an identification tag 80) and a leash clip 82 coupled to a leash 84 to be mounted to the combination D-ring and bottle opener 20 at the same time and simultaneously allow it to function as an opener (a bottle cap is represented by dashed line 86). Further, because the combination D-ring and bottle opener 20 can flip-flop in this slot 44, the opening of a bottle can be accomplished while being worn by a pet. Further the radius pry feature 36 and rounded grooves 32 and 34 ensure that the leash or I.D. (or i.e.) tag do not become tangled or caught when used as any conventional D-ring. Further, the rounded corners prevent injury to the animal.

In the various embodiments, the design has been optimized to create the shortest overall length, as well as shortest standoff height (length that D-Ring stands off of collar) while still allowing operation of opening a bottle. If the length of the frame body is much longer it will make it easier to open a bottle, but the dog may snag it on something, thus being dangerous to the dog. If you make it shorter, opening a bottle will be very difficult or impossible. The void or opening adjacent to member 22 is critical to overall length. Making this opening too short will not allow the opener to swivel 180 degrees perpendicular to the collar; making it to long will result in an overall length that poses danger to the dog.

The prying flange length is critical as well. The human operator uses the prying flange to open bottles. The user would normally place his thumb on top or fingers on the backside of the prying flange. A large plying flange makes opening easier, but increases the overall length of the opener (problems stated above) and/or decreases the opener/bottle cap area (which will make opening more difficult as more force is needed, or impossible as hinge bar would not engage the opener). Just a note that the opener is a lever, so the longer the lever, the less force needed to open the bottle.

Also, an identification tag 80 can be coupled to the combination bottle opener 20 at the first inner loop defined by the void defined by the first linking member 22, the intermediate linking member 24, and the two arms 28 and 30, for example. There is sufficient clearance for both a coupling means 86 and collar strap 12 in this void.

Figure 6:
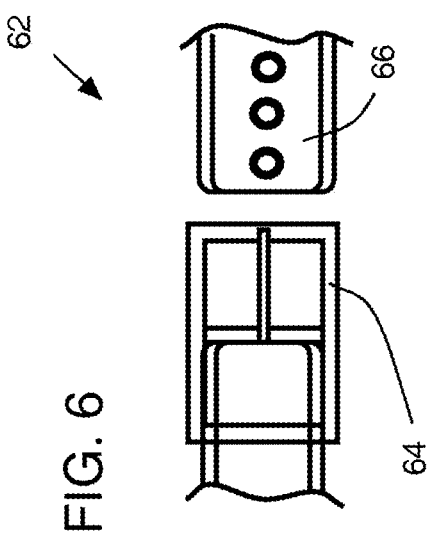
FIG. 6 is a detail top view of a buckle mechanism according to a second preferred embodiment of the present invention.

A second preferred embodiment, as FIG. 6 shows, includes a buckle 62 clasping system comprising a strap first end 18 doubled over a short distance, the overlap is maintained by stitching and the overlap captures a cross bar of the buckle frame 64. A single hole is punched in the two-ply strap 12 to allow the pawl of the buckle to pass therethrough. At an intermediate portion of the strap adjacent to the second end 19 includes at least one hole and grommet for receiving the pawl. Otherwise the construction, use, and operation of this second preferred embodiment mimics the first preferred embodiment.

Figure 7:
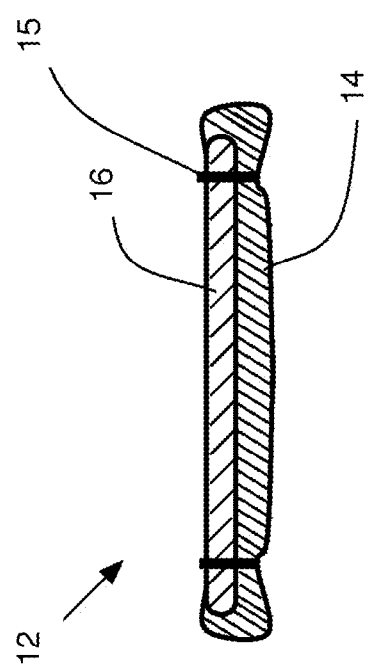
FIG. 7 is a cross-sectional end view of the strap of the various preferred embodiments according to the present invention.

FIG. 7, a cross-sectional end view of a strap 12 according to both the first and second preferred embodiments of the present invention, illustrates a two-ply strap. The strap 12, a strip of flexible material, which may be of any strong, durable, flexible material, most preferably comprises a first ply 14 of a rubber, or rubber like substance. In the preferred embodiments, the first ply 14 comprises an inner tube material recycled from used bicycle inner tubes, which are abundantly available from most bicycle repair shops worldwide. The strap 12 further includes a second ply 16 of any strong, durable, flexible material, but preferably a strong nylon fabric: However, ballistic nylon or leather would be suitable alternatives. The two plies are mechanically fastened together interlocked stitched thread 15, preferably a 92-oz. polyester or nylon material about 0.3 mm in thickness. In other embodiments the two layers may further include a chemical adhesive bond.

Since introduction of the original planar 180 degree swing parallel pry combination D-Ring and bottle opener, the inventor has realized that there are other geometries and/or configurations for the combination D-Ring and bottle opener, other configurations for a pry hook related thereto, and different applications for such a compact bottle opener and attachment member combination device that have merit. As such, the inventor has designed various improvements and changes to the original combination D-ring and bottle opener on a strap as will now be described in reference to FIGS. 9-29.

Figure 9:
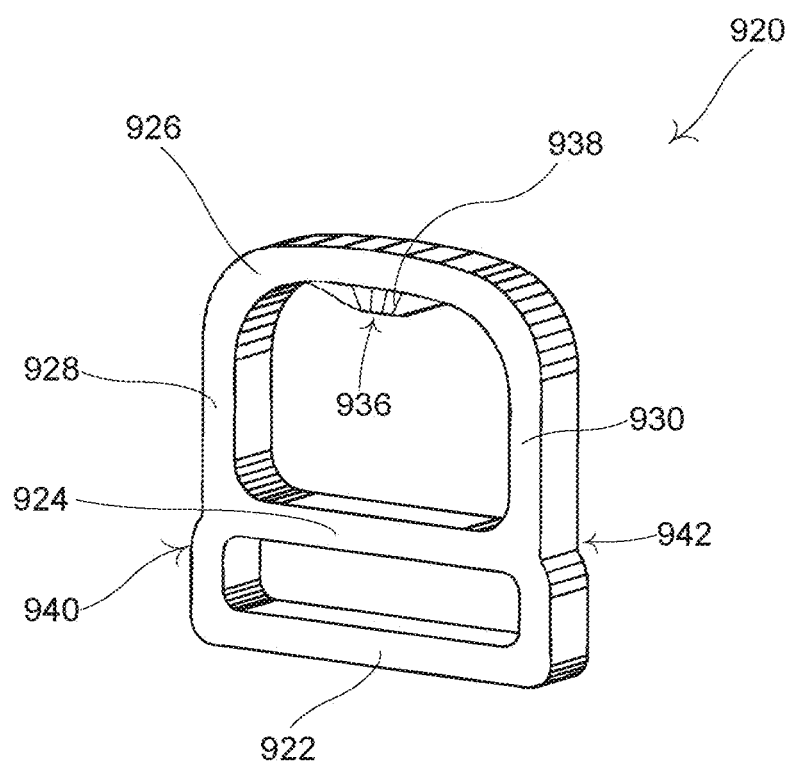
FIG. 9 is a perspective view of another embodiment of the present invention including a D-ring and bottle opener, according to a third preferred embodiment of the present invention.

Referring now to FIG. 9, a perspective view of another embodiment of the present invention including a D-ring and bottle opener according to a another embodiment of the present invention is provided. FIG. 9, like FIGS. 4 and 8, details the combination D-ring and bottle opener 920 of one preferred embodiment of the present invention. The combination D-ring and bottle opener 920 may be very similar to the combination D-ring and bottle opener 20 shown in FIG. 8, but having the pry hook region 936 located on, with or extending from the second (outer most) linking member 926 (second linking member or hinge bar 26) rather than the intermediate linking member 924 (intermediate linking member or pry hook 24). In this configuration, the bottle opener would operate in the opposite manner to open a bottle. In this design, the combination D-ring and bottle opener 920 may be, for example, a flat rectilinear body having a first (right side) arm 930 along one length, with intermediate shoulder feature 942, extending vertically and a second (left) arm 928 arranged generally parallel to the first arm and also including its own intermediate shoulder feature 940. The arms may be separated by three linking members; at the lower or proximal end of the arms 928 and 930 a first linking member 922, and at the upper or distal end a second linking member or pry bar end 926, and an intermediate linking member or hinge hook 924 somewhere in between the other two links, preferably closer to the first linking member 922 than the second linking member 926 so that a strap attachment hole or void is smaller than the bottle-opening hole or void. The first linking member 922, right arm 930, intermediate link 924, and the left arm 928 border or form a void that is the strap attachment hole or void (where a strap or collar may be threaded through). This void may receive, for example, a multi-layered strap such as a two-ply strap 12 (similar to the one shown above in FIGS. 1, 2 and 7), as similarly shown in FIG. 5 above for the previously described combination D-ring and bottle opener. The pry hook radius 936 may include a prying flange 938 tapered from larger to small (width and/or length) as facing toward the intermediate link 924. The intermediate link 924 may be of sufficient size (width) to enable a logo or other mark to be affixed thereon for marketing or promotional or other purposes. The corners of the opener 920 may be rounded and the edges smoothed to prevent catching animal fur or cutting tissue. Of particular note, the grooves and radiussed pry feature 936 may be made smooth, arcuate and radiussed edges that flow into each other without any sharp features.

This combination D-ring and bottle opener 920 may further include a bottle-opening portion consisting of the intermediate link or hinge bar 924 and a third linking member or pry hook bar 926, in conjunction with a portion of right arm 930 and left arm 928. The radius 936 forms a bottle pry for inserting under the lip of a crimped on bottle lid and the intermediate linking member 924 forms the hinge bar that passes over the top of the bottle lid so that a downward rotation of the opener 920 relative to the bottle lid forces the bottle pry region 936 to lift up the overhanging portion of the crimped on lid, while the hinge bar 924 restricts relative movement of the lid, thus forcing it open— as would be well understood in this art. As would be appreciated by one skilled in the art, the opposite orientation of the pry hook for this embodiment would require more use of the strap or collar to pry off a bottle cap and less relative freedom or swing of the combination D-ring or attachment mechanism and bottle opener 920 such that the thickness may be larger, for example, approximately 2-4 mm and the width of the through hole or opening for a strap or collar may be smaller (relative to the strap or collar thickness).

As noted in the above embodiments, it may be preferred for the design has been optimized to create the shortest overall length, as well as shortest standoff height (length that D-Ring stands off of collar), while still allowing operation of opening a bottle. Although the combination bottle opener/D-ring would work better as a bottle opener in a longer length, this would result in an increased probability that the device would snag on various things such as a dog's fur or an item the dog may encounter while moving around. Furthermore, a shorter design, although less-likely to snag, at some reduced size would be inoperable as an opener as the opening force would be impractically high (lacking much leverage). So the size of the combination D-ring (or attachment member) bottle opener is important to consider.

Some possible dimensions for the combination D-ring and bottle opener 920 for use with a dog collar may be, for example, a frame body (entire rectangular dimension) having an overall thickness of approximately about 2-4 mm, overall length of approximately 30-38 mm, opener/bottle cap area inside dimension of about 25-29 mm wide by approximately 15-19 mm in length or height (widest dimension from the third linking member or pry hook bar 926 to the second linking member or hinge bar 926). The prying flange 38 may have a length of approximately 6-9 mm and the strap or collar through hole or void may have a width of approximately a width of 25-29 mm and a height of approximately 5-10 mm. The width of the various linking members 922, 924, and 926 and arm members 928 and 930 may be approximately 3-5 mm. As mentioned above, the dimensions selected are important to making sure that the combination D-ring and bottle opener 920 works well both as a bottle opener, as a attachment mechanism (for E.g. attaching a leash), and with a collar on a dog or other applications. One skilled in the art would appreciate that the design of the bottle opener may need to be modified in various applications.

In this embodiment the combination D-ring and bottle opener 920 may be made of a metal or similarly strong material, for example steel or stainless steel. In these preferred embodiments the combination D-ring and bottle opener 920 may be fabricated in a stamping operation then put through a hardening process or molded. For strength purposes, the entire combination D-ring and bottle opener 920 is made as an integral piece. However a similar strength may be achieved by bending and welding together various individual portions or pieces. Surface finishing may be done through hang-up plating with a rust inhibiting coating. Although in this embodiment the opener 920 may be coated with a rust inhibiting material, other contemplated embodiment include using aluminum or stainless steel—some dimensions would be understood to be modified to provide the sufficient strength required to prevent the opener 920 from bending and/or breaking when applied to open a bottle.

Figure 10:
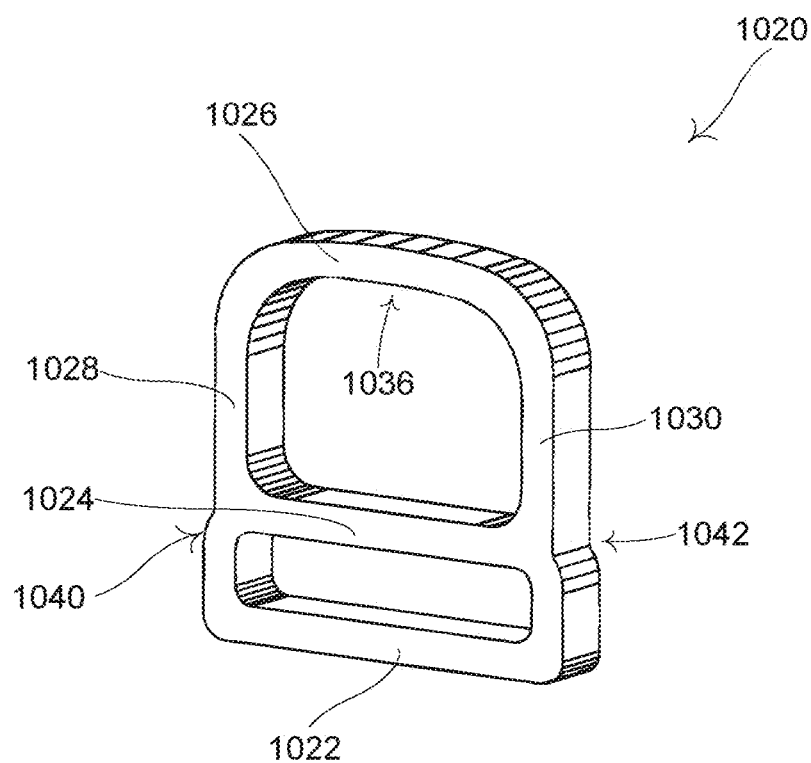
FIG. 10 is a perspective view of a further embodiment of the present invention including a D-ring and bottle opener, according to a fourth preferred embodiment of the present invention.

Referring now to FIG. 10, a perspective view of a further embodiment of the present invention including a D-ring and bottle opener is provided, according to yet another preferred embodiment of the present invention. FIG. 10, like the embodiments in FIGS. 4, 8 and 9, details the combination D-ring and bottle opener 1020 of one preferred embodiment of the present invention. The combination D-ring and bottle opener 1020 may be very similar to the combination D-ring and bottle opener 920 shown in FIG. 9, but without having a pry hook protruding inward at region 1036 nor located on, with or extending from the second (outer most) linking member 1026 (second linking member or hinge bar 26) nor the intermediate linking member 1024 (intermediate linking member or pry hook 24). In this configuration, the bottle opener may operate in the same or opposite manner as the combination D-ring and bottle opener 920 to open a bottle.

In this design, the combination D-ring and bottle opener 1020 may be, for example, a flat rectangular shaped body with two through holes or voids, having a first (right side) arm 1030 along one length, with intermediate shoulder feature 1042, extending vertically and a second (left) arm 1028 arranged generally parallel to the first arm and also including its own intermediate shoulder feature 1040. The arms may be separated by three linking members at the lower or proximal end of the arms 1028 and 1030 by a first linking member 1022, and at the upper or distal end by a second linking member or hinge bar end 1026, and by an intermediate linking or prying member 1024 somewhere in between the other two links, preferably closer to the first linking member 1022 than the second linking member 1026 so that a strap attachment hole or void may be a smaller size (area) and height than the bottle-opening hole or void. The first linking member 1022, right arm 1030, intermediate link 1024, and the left arm 1028 border or form a void that is the strap attachment hole or void (where a strap or collar may be threaded through). This void or hole may receive, for example, a multi-layered strap such as a two-ply strap 12 (similar to the one shown above in FIGS. 1, 2 and 7) or a single ply strap, as similarly shown in FIG. 5 above for the previously described combination D-ring and bottle openers or as shown below. The pry hook radius location 1036 may not in this design include a prying flange, nor on the intermediate or third linking member 1024. This design seems similar to the others previously discussed in detail, however, in this embodiment the size (area) and height of both through holes or voids may be closer to being the same than the other previously described embodiments.

Although the intermediate link 1024 as shown is not particularly wide and is approximately the same width as the other linking and arm members, it may be of sufficient size (width) to enable a logo or other mark to be affixed thereon for marketing or promotional or other purposes such as to improve its prying strength (not shown). The corners of the opener 1020 may be rounded and the edges smoothed to prevent catching animal fur or cutting tissue. Furthermore, although the various dimensions of the combination D-ring bottle opener 1020 may be generally the same as those for combination D-ring bottle opener 920, height of the bottle opening hole or void would likely be smaller because there is no pry hook protruding into the bottle opening hole or void bounded by the left arm 1028, right arm 1030, second or hinge linking member 1026, and intermediate or prying linking member 1024, for example, in the range of approximately 9-14 mm in length or height (widest dimension from the intermediate or third linking member or pry bar 1024 to the second linking member or hinge bar 1026 (without a pry hook)).

This combination D-ring and bottle opener 1020 may further include a bottle-opening portion or rectangle consisting of the intermediate link or prying bar 1024 and a third linking member or hinge bar 1026, in conjunction with a portion of right arm 1030 and left arm 1028. This rectangle is somewhat symmetrical, and as such one skilled in the art would appreciate that either the intermediate linking member 1024 or the second linking member 1026 may form or operate as the prying bar for inserting under the lip of a crimped on bottle lid and/or the hinge bar that passes over the top of the bottle lid so that a downward rotation of the opener 1020 relative to the bottle lid forces the bottle hinging or pry region (e.g., region 1036) to lift up the overhanging portion of the crimped on lid, while the other operates as the hinge bar (e.g., 1024 o4 1026) that restricts relative movement of the lid, thus forcing it open—as would be well understood in this art. As would be appreciated by one skilled in the art, the elimination of the pry hook for this embodiment may, in some orientation and use, may require more use of the strap or collar to pry off a bottle cap and less relative freedom or swing of the combination D-ring or attachment mechanism and bottle opener 1020 such that the thickness may be larger, for example, approximately 2-4 mm or more and the width of the through hole or opening for a strap or collar may be smaller (relative to the strap or collar thickness). Further, one would appreciate that the width of the intermediate link or prying bar 1024 may be made wider so as to bolster its prying strength, for example, approximately 5-10 mm.

The combination D-ring or attachment mechanism and bottle opener 1020 may also be made using the same materials and methods as mentioned for the previously describe combination D-ring or attachment mechanism and bottle openers.

Figure 11A:
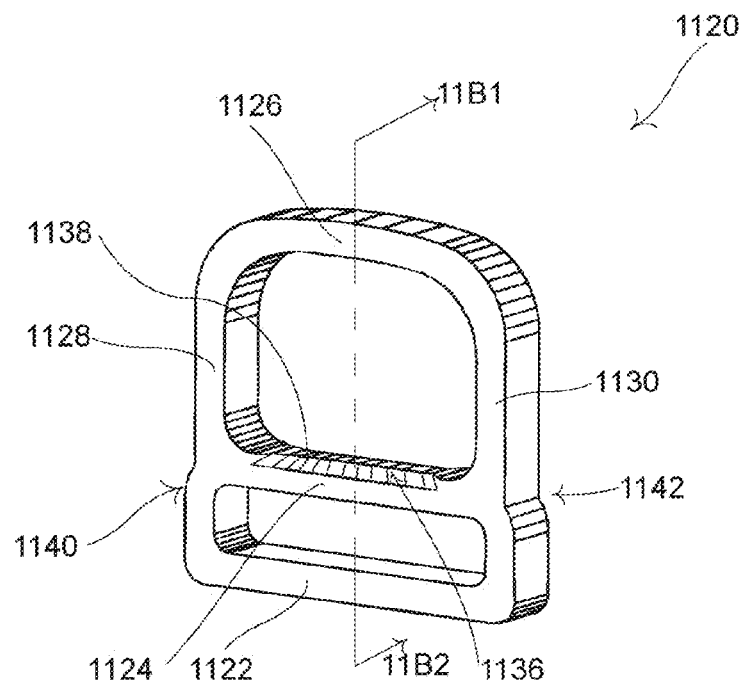
FIG. 11A is a perspective view of a still further embodiment of the present invention including a D-ring and bottle opener according to a fifth preferred embodiment of the present invention.
Figure 11B:
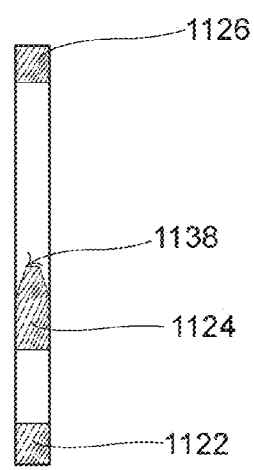
FIG. 11B is a cross sectional view of a still further embodiment of the present invention including a D-ring and bottle opener taken across line 1102 in FIG. 11A, according to the fifth preferred embodiment of the present invention.

Referring now to FIGS. 11A and 11B (with reference also to FIG. 12), a perspective view of a still further embodiment of the present invention including a D-ring and bottle opener is provided, according to the present invention. FIGS. 11A and 11B, like the embodiments in FIGS. 4, 8, 9 and 10, details the combination D-ring and bottle opener 1120 of one preferred embodiment of the present invention. The combination D-ring and bottle opener 1120 may be very similar to the combination D-ring and bottle opener 920 shown in FIG. 9, but without having a pry hook protruding inward at region 1136 or extending from the intermediate linking member 1124 (intermediate linking member or pry hook 24) toward the second (outer most) linking member 1126 (second linking member or hinge bar 26). In this configuration, the bottle opener may operate in the same manner as the combination D-ring and bottle opener 920 to open a bottle by placing a beveled edge 1138 of a prying area 1136 onto the lower edge of a bottle cap and the second or hinge linking member 1126 on the top of the bottle cap, and prying the bottle cap from the bottle.

In this design, the combination D-ring and bottle opener 1120 may be, for example, a flat rectangular shaped body with two through holes or voids, having a first (right side) arm 1130 along one length, with intermediate shoulder feature 1142, extending vertically and a second (left) arm 1128 arranged generally parallel to the first arm and also including its own intermediate shoulder feature 1140. The arms may be separated by three linking members at the lower or proximal end of the arms 1128 and 1130 by a first linking member 1122, and at the upper or distal end by a second linking member or hinge bar end 1126, and by an intermediate linking or prying member 1124 somewhere in between the other two links, preferably closer to the first linking member 1122 than the second linking member 1126 so that a strap attachment hole or void may be a smaller size (area) and height than the bottle-opening hole or void. The first linking member 1122, right arm 1130, intermediate link 1124, and the left arm 1128 border or form a void that is the strap attachment hole or void (where a strap or collar may be threaded through). This void or hole may receive, for example, a two-ply strap 12 (similar to the one shown above in FIGS. 1, 2 and 7) or a single ply strap, as similarly shown in FIG. 5 above for the previously described combination D-ring and bottle openers or as shown below. The pry hook radius location 1136 may not in this design include a prying flange, nor on the intermediate, third or prying linking member 1124. This design seems similar to the others previously discussed in detail, however, in this embodiment the size (area) and height of both through holes or voids may be closer to being the same than the other previously described embodiments.

Although the intermediate link 1124 as shown is not particularly wide and is approximately the same width as the other linking and arm members, it may be of sufficient size (width) to enable a logo or other mark to be affixed thereon for marketing or promotional or other purposes (not shown) and/or to improve its prying strength. The corners of the opener 1120 may be rounded and the edges smoothed to prevent catching animal fur or cutting tissue. Furthermore, although the various dimensions of the combination D-ring bottle opener 1120 may be generally the same as those for combination D-ring bottle opener 920, like the combination D-ring and bottle opener 1020 in FIG. 10, the height of the bottle opening hole or void may be or would likely be smaller because there is no pry hook protruding into the bottle opening hole or void bounded by the left arm 1128, right arm 1130, second or hinge linking member 1126, and intermediate or prying linking member 1124, for example, in the range of approximately 9-14 mm in length or height (widest dimension from the second linking member or hinge bar 1126 to the intermediate linking member or prying bar 1124 (without a pry hook)).

This combination D-ring and bottle opener 1120 may include a bottle-opening portion or rectangle consisting of the intermediate link or prying bar 1124 and a second linking member or hinge bar 1126, in conjunction with a portion of right arm 1130 and left arm 1128 that is improved in size and strength without having a protruding pry hook. This rectangle is somewhat symmetrical, and as such one skilled in the art would appreciate that either the intermediate linking member 1124 or the second linking member 1126 may include the beveled pry hook 1138 formed to operate as the prying bar for inserting under the lip of a crimped on bottle lid and/or the hinge bar that passes over the top of the bottle lid so that a downward rotation of the opener 1120 relative to the bottle lid forces the bottle hinging or pry region (e.g., region 1036) to lift up the overhanging portion of the crimped on lid, while the other operates as the hinge bar (e.g., 1124 o4 1126) that restricts relative movement of the lid, thus forcing it open—as would be well understood in this art. As would be appreciated by one skilled in the art, the inclusion of the beveled pry hook 1138 for this embodiment may, in some orientation and use, require more use of the strap or collar to pry off a bottle cap and less relative freedom or swing of the combination D-ring or attachment mechanism and bottle opener 1120 such that the thickness may be larger, for example, approximately 2-4 mm or more and the width of the through hole or opening for a strap or collar may be smaller (relative to the strap or collar thickness) depending on which of the two linking members the beveled pry hook 1138 is placed or formed. Further, one would appreciate that the width of the intermediate link or prying bar 1124 may be made wider so as to bolster its prying strength, for example, approximately 5-10 mm, particularly when the beveled pry hook 1138 is located thereon.

The combination D-ring or attachment mechanism and bottle opener 1120 may also be made using the same materials and methods as mentioned for the previously describe combination D-ring or attachment mechanism and bottle openers. The beveled pry hook 1138 may be formed by a grinding operation, a stamping operation, or a molding operation, depending on how the combination D-ring or attachment mechanism and bottle opener 1120 is made or manufactured.

Figure 12:
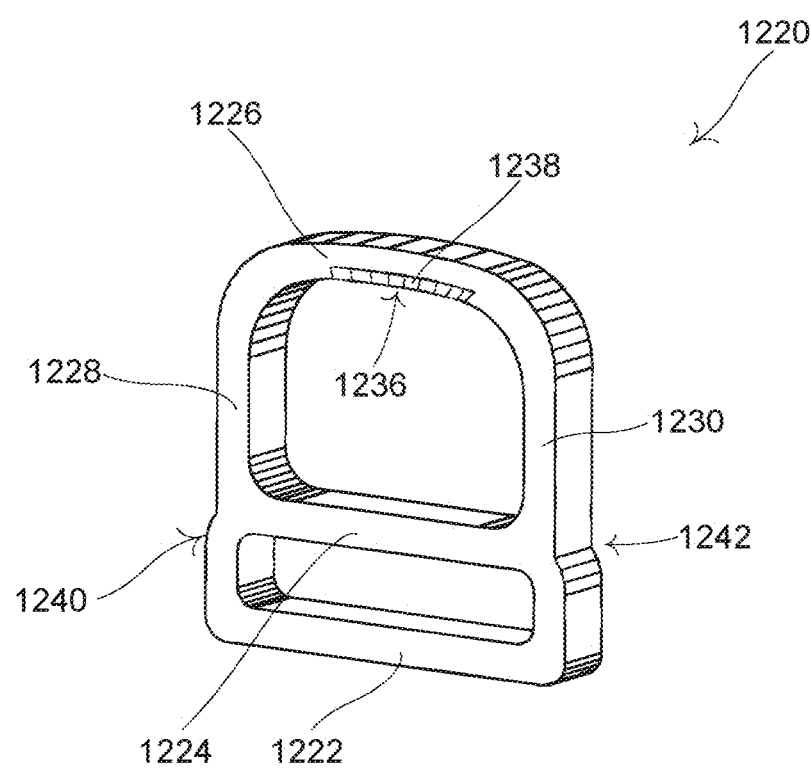
FIG. 12 is a perspective view of a still further embodiment of the present invention including a D-ring and bottle opener according to a sixth preferred embodiment of the present invention.

Referring now to FIG. 12 a perspective view is provided of a still further embodiment of the present invention including a D-ring and bottle opener 1220 according to a sixth preferred embodiment of the present invention as eluded to above when describing FIG. 11. The combination D-ring and bottle opener 1220 may be very similar to the combination D-ring and bottle opener 920 shown in FIG. 9, but without having a pry hook protruding inward at region 1236 or extending from the second (outer most) linking member 1226 (second linking member or hinge bar 926) toward the intermediate linking member 1224 (intermediate linking member or pry hook 924). In this configuration, the bottle opener may operate in the same manner as the combination D-ring and bottle opener 920 to open a bottle by placing a beveled edge 1238 of a prying area 1236 onto the lower edge of a bottle cap and the intermediate or hinge linking member 1224 on the top of the bottle cap, and prying the bottle cap from the bottle.

In this design, the combination D-ring and bottle opener 1220 may be, for example, a flat rectangular shaped body with two through holes or voids, and may have a first (right side) arm 1230 along one length, with intermediate shoulder feature 1242, extending vertically and a second (left) arm 1228 arranged generally parallel to the first arm and may also including its own intermediate shoulder feature 1240. The arms may be separated by three linking members at the lower or proximal end of the arms 1228 and 1230 by a first linking member 1222, and at the upper or distal end by a second linking member or pry bar end 1226, and by an intermediate linking or hinge member 1224 somewhere in between the other two links, preferably closer to the first linking member 1222 than the second linking member 1226 so that a strap attachment hole or void may be a smaller size (area) and height than the bottle-opening hole or void. The first linking member 1222, right arm 1230, intermediate link 1224, and the left arm 1228 border or form a void that is the strap attachment hole or void (where a strap or collar may be threaded through). This void or hole may receive, for example, a multi-layered strap such as a two-ply strap 12 (similar to the one shown above in FIGS. 1, 2 and 7) or a single ply strap, as similarly shown in FIG. 5 above for the previously described combination D-ring and bottle openers or as shown below. The pry hook radius location 1236 may not in this design include a prying flange, nor on the intermediate, third or hinge linking member 1224, rather it may include a prying bevel 1239 in the prying area 1236. This design seems similar to the others previously discussed in detail, however, in this embodiment the size (area) and height of both through holes or voids may be closer to being the same in height and/or area than the other previously described embodiments.

Although the intermediate link 1224 as shown is not particularly wide and is approximately the same width as the other linking and arm members, it may be of sufficient size (width) to enable a logo or other mark to be affixed thereon for marketing or promotional or other purposes (not shown) and/or to improve its prying strength. This may also be true in this embodiment for the second or prying linking member 1226. The corners of the opener 1220 may be rounded and the edges smoothed to prevent catching on various items, for example, animal fur or cutting tissue. Furthermore, although the various dimensions of the combination D-ring bottle opener 1220 may be generally the same as those for combination D-ring bottle opener 920, like the combination D-ring and bottle opener 1020 in FIG. 10 and the combination D-ring and bottle opener 1120 in FIG. 11, the height of the bottle opening hole or void may be or would likely be smaller because there is no pry hook protruding into the bottle opening hole or void bounded by the left arm 1228, right arm 1230, second or pry linking member 1226, and intermediate or hinge linking member 1224, for example, in the range of approximately 9-14 mm in length or height (widest dimension from the second linking member or pry bar 1226 with a beveled and not protruding pry hook area 1236 to the intermediate linking member or hinge bar 1124).

This combination D-ring and bottle opener 1220 may include a bottle-opening portion or rectangle consisting of the intermediate link or hinge bar 1224 and a second linking member or pry bar 1226, in conjunction with a portion of right arm 1230 and left arm 1228 that is improved in size and strength without having a protruding pry hook. This rectangle is somewhat symmetrical, and as such one skilled in the art would appreciate that either the intermediate linking member 1224 or the second linking member 1226 may include the beveled pry hook 1238 formed to operate as the prying bar for inserting under the lip of a crimped on bottle lid and/or the hinge bar that passes over the top of the bottle lid so that a downward rotation of the opener 1220 relative to the bottle lid forces the bottle hinging or pry region (e.g., region 1236) to lift up the overhanging portion of the crimped on lid, while the other operates as the hinge bar (e.g., 1224 o4 1226) that restricts relative movement of the lid, thus forcing it open—as would be well understood in this art (see also FIGS. 11A and 11B above). As would be appreciated by one skilled in the art, the inclusion of the beveled pry hook 1238 for this embodiment may, in some orientation and use, require more use of the strap or collar to pry off a bottle cap and less relative freedom or swing of the combination D-ring or attachment mechanism and bottle opener 1220 such that the thickness may be larger, for example, approximately 2-4 mm or more and the width of the through hole or opening for a strap or collar may be smaller (relative to the strap or collar thickness) depending on which of the two linking members the beveled pry hook 1238 is placed or formed. Further, one would appreciate that the width of the second link or prying bar 1226 may be made wider so as to bolster its prying strength, for example, approximately 5-10 mm, particularly when the beveled pry hook 1238 is located thereon.

The combination D-ring or attachment mechanism and bottle opener 1220 may also be made using the same materials and methods as mentioned for the previously describe combination D-ring or attachment mechanism and bottle openers. The beveled pry hook 1238 may be formed by a grinding operation, a stamping operation, or a molding operation, depending on how the combination D-ring or attachment mechanism and bottle opener 1220 is made or manufactured.

Referring now to FIGS. 13-17, another embodiment of the present invention is provided including a combination attachment mechanism and bottle opener that may be coupled to a strap, collar, etc. In this embodiment the combination attachment mechanism and bottle opener may be used in the place of or as a D-ring coupled to, for example, a dog collar, but may have an oval or circular shape rather than a D shape. In this regard a design patent application was filed on Jun. 8, 2015, U.S. Design patent application Ser. No. 29/529,147, which illustrates the different geometry and is hereby incorporated by reference for all purposes. A detailed description of the oval shaped combination attachment mechanism and bottle opener 1320 with it being coupled to a collar or strap follows.

Figure 13:
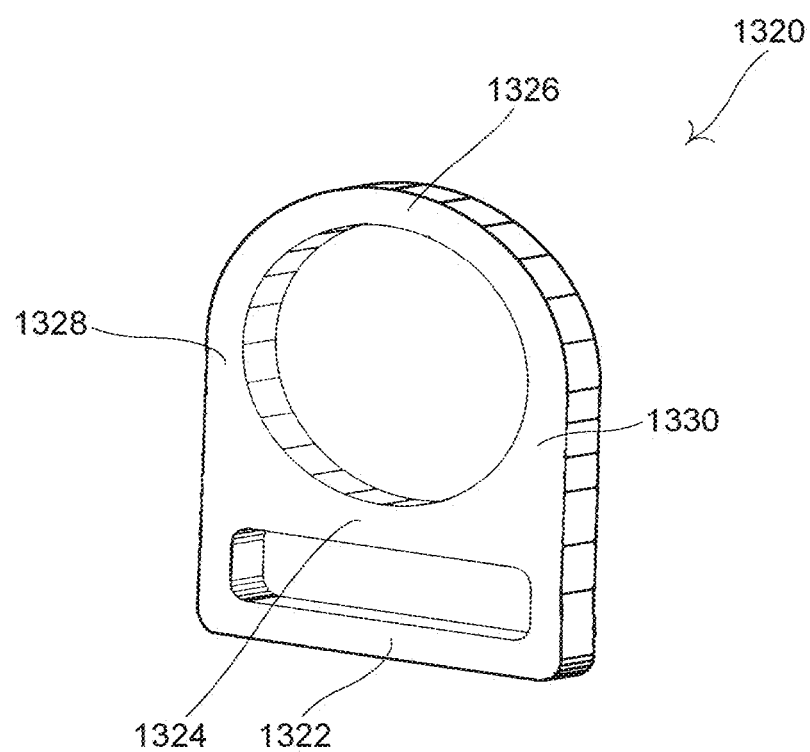
FIG. 13 is a perspective view of an even further embodiment of the present invention including a attachment mechanism and bottle opener, according to a seventh preferred embodiment of the present invention.

FIG. 13 is a perspective view of the combination attachment mechanism and bottle opener 13, according to a still further embodiment of the present invention. The combination oval attachment member ring and bottle opener 1320 may be very similar to the combination D-ring and bottle opener 1020 shown in FIG. 10, both not having a pry hook protruding inward into the hole or void that would be used to pry open a bottle cap from a bottle, without extending from the second (outer most) linking member 1326 (similar to the second linking member or hinge bar 26, though rounded) nor the intermediate linking member 1324 (similar to the intermediate linking member or pry hook 24, though rounded or curved on the inner side facing the bottle opening hole or void). In this configuration, the bottle opener may operate in the same or opposite manner as the combination D-ring and bottle opener 1020 to open a bottle. In a preferred manner, the intermediate linking member 1324 would be the pry bar and the second (outer most) linking member 1326 would be the hinge bar. As with the other D-ring shaped embodiments, one skilled in the art would appreciate that the oval loop may be used to attach, for example, a leash or ID tag thereto.

In this design, the combination attachment member and bottle opener 1320 may be, for example, a flat rectangular shaped body on one side and a rounded or oval shaped body opposite thereto and include two through holes or voids, having a first (right side) arm 1330 along one side (note that this embodiment does not include an intermediate shoulder feature, but could) extending vertically and a second (left side) arm 1328 arranged generally parallel to and opposite the first arm 1330 (note also that in this embodiment the second arm does not include its own intermediate shoulder feature, but could). The arms 1328 and 1330 may be separated by three linking members, one at the lower or proximal end of the arms 1328 and 1330 by a first linking member 1322, and at the upper or distal end by a second linking member or hinge bar end 1326, and by an intermediate linking or prying member 1324 somewhere in between the other two links, preferably closer to the first linking member 1322 than the second linking member 1326 so that a strap attachment hole or void may be a smaller size (area) and height than the bottle-opening hole or void. It is noteworthy that in this embodiment the second linking member 1326 is rounded or curve acutely so as to reach downward toward the intermediate linking member 1324 so as to meet coincidentally the arms 1328 and 1330, and with the intermediate linking or prying member 1324 form an oval shape into which a bottle cap may be placed to be removed from a bottle.

Figure 15:
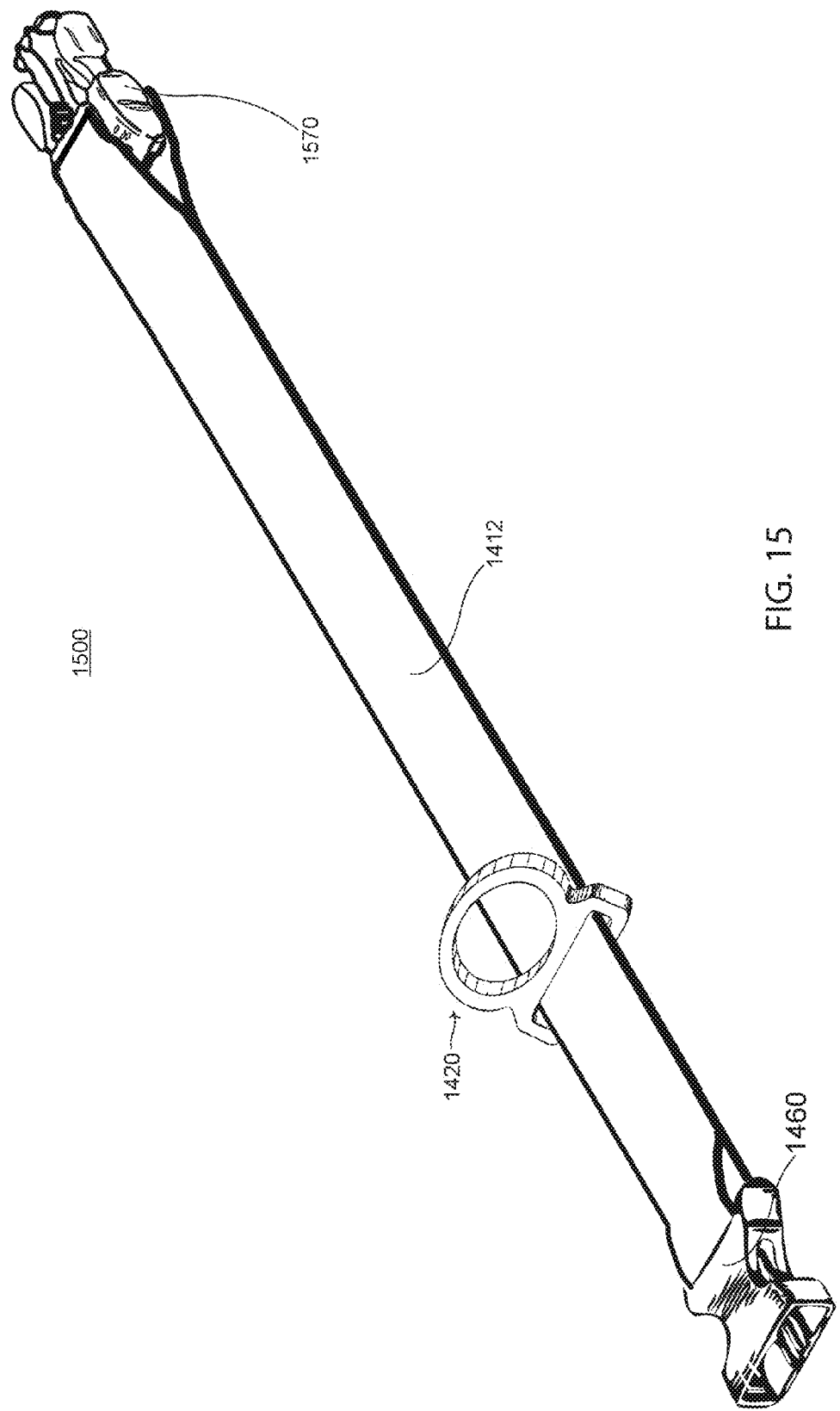
FIG. 15 is a perspective view of an embodiment of the present invention including the attachment mechanism and bottle opener of FIG. 13 attached to a collar or strap with a buckle portion on each end, according to a preferred embodiment of the present invention.
Figure 16:
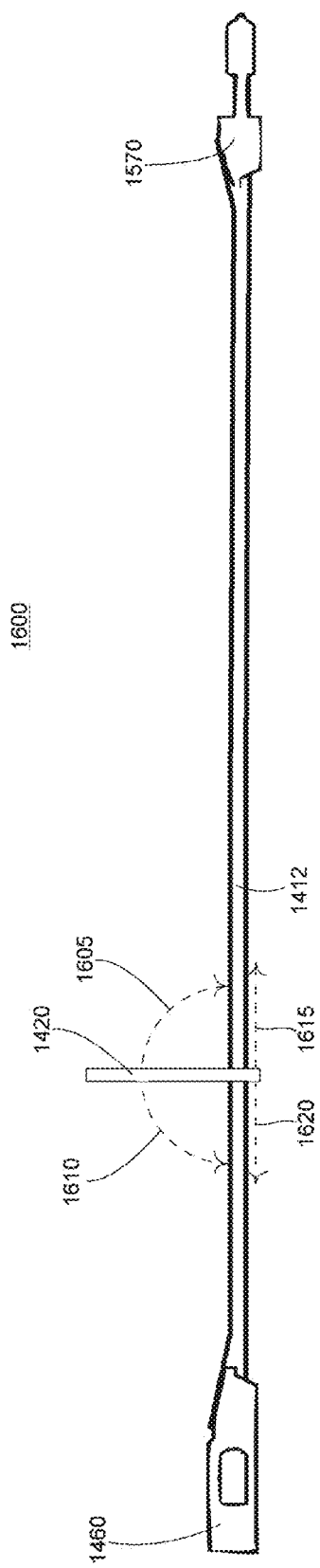
FIG. 16 is a side view of an embodiment of the present invention including the attachment mechanism and bottle opener attached to a collar or strap with a buckle portion on each end as in FIG. 15, according to a preferred embodiment of the present invention.
Figure 17:
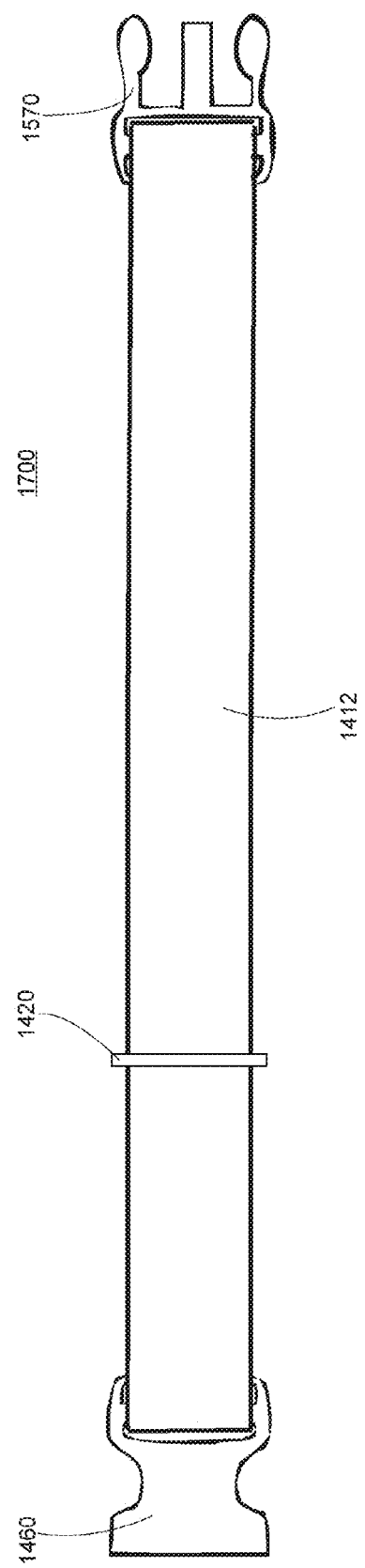
FIG. 17 is a top view of an embodiment of the present invention including the attachment mechanism and bottle opener attached to a collar or strap with a buckle portion on each end as in FIG. 15, according to a preferred embodiment of the present invention.

The first linking member 1322, right arm 1330, intermediate link 1324, and the left arm 1328 border or form a void that may be the strap attachment hole or void (where a strap or collar may be threaded through so as to attach it thereto). This void or hole may receive, for example, a multi-layered strap such as a two-ply strap 12 (similar to the one shown above in FIGS. 1, 2 and 7) or a single ply strap as illustrated in FIGS. 15-17, as similarly shown in FIG. 5 above for the previously described combination D-ring and bottle openers or as shown below in FIGS. 14-17. Although there is no pry hook radius location or pry hook in this design, on skilled in the art would understand that a pry hook include either a beveled prying hook or a prying flange may be included on either of the intermediate link member 1324 or the second linking member 1326. As shown in FIG. 13, the design may be considered bi-directional because the pry bar may be either the intermediate link member 1324 or the second linking member 1326. This design is similar to the previously described combination D-ring and bottle opener and varies primarily in the shape of the bottle opening hole or void being oval. One skilled in the art would appreciate that a round void or hole is not as practical or have the manner or ease of function desired unless a protruding pry hook is used on one of the intermediate link member 1324 or the second linking member 1326, because the bottle cap is round and must fit through at least the side areas 1328 and 1330. However, it is best if the bottle cap does not fit through the intermediate link member 1324 and the second link member 1326 simultaneously so that the bottle opener will only fit over a closed bottle cap and bottle in one dimension, rather than fit completely over the round bottle cap. As such, if the bottle opening hole or void is round, a protruding pry hook should be used so that both intermediate link member 1324 and the second link member 1326 do not simultaneously slip over the bottle cap. As illustrated for this embodiment in FIGS. 13-17, the size (area) and height of both through holes or voids may be closer to being the same than the other previously described embodiments that have a pry hook protruding into the bottle opening hole or void.

Although the intermediate link 1324 as shown is not particularly wide and is approximately the same width as the other linking and arm members, it may be increase in size to be of sufficient size (width) to enable a logo or other mark to be affixed thereon for marketing or promotional or other purposes such as to improve its prying strength (not shown). The corners of the opener 1320 may be rounded and the edges smoothed to prevent catching on various things, for example, animal fur or cutting tissue. Furthermore, although the various dimensions of the combination oval attachment member and bottle opener 1320 may be generally the same as those for combination D-ring bottle openers such. as 920, similar to the combination D-ring and bottle opener 1020 in FIG. 10, the height of the bottle opening hole or void would likely be smaller because there is no pry hook protruding into the bottle opening hole or void bounded by the left arm 1328, right arm 1330, rounded second or hinge linking member 1326, and rounded intermediate or prying linking member 1324, for example, in the range of approximately 9-14 mm in length or height (widest dimension from the intermediate or third linking or pry bar member 1324 (without a pry hook) to the second linking member or hinge bar 1326).

This combination attachment mechanism and bottle opener 1320 may further include a bottle-opening portion or mostly oval shape consisting of the intermediate link or prying bar 1324 and a third linking member or hinge bar 1326, in conjunction with a portion of right arm 1330 and left arm 1328. This mostly oval shape structure is somewhat symmetrical, and as such one skilled in the art would appreciate that either the intermediate linking member 1324 or the second linking member 1326 may form or operate as the prying bar for inserting under the lip of a crimped on bottle lid and/or the hinge bar that passes over the top of the bottle lid so that a downward rotation of the opener 1320 relative to the bottle lid forces the bottle hinging or pry region (e.g., the region just above 1324) to lift up the overhanging portion of the crimped on lid, while the other operates as the hinge bar (e.g., 1324 or 1326) that restricts relative movement of the lid, thus forcing it open—as would be well understood in this art. As would be appreciated by one skilled in the art, the elimination of the pry hook for this embodiment may, in some orientation and use, may require more use of the strap or collar to pry off a bottle cap and less relative freedom or swing of the combination D-ring or attachment mechanism and bottle opener 1320 such that the thickness may be larger, for example, approximately 2-4 mm or more and the width of the through hole or opening for a strap or collar may be smaller (relative to the strap or collar thickness). Further, one would appreciate that the width of the intermediate link or prying bar 1324 may be made wider so as to bolster its prying strength, for example, approximately 5-10 mm. And as shown in FIG. 13, the sides of the intermediate link or prying bar 1324 may be necessarily wider than that of a D-ring embodiment because of the oval shape to the bottle opening whole and relatively rectangular and rounded outer surface or geometric shape.

The combination D-ring or attachment mechanism and bottle opener 1320 may also be made using the same materials and methods as mentioned for the previously describe combination D-ring or attachment mechanism and bottle openers.

Figure 14:
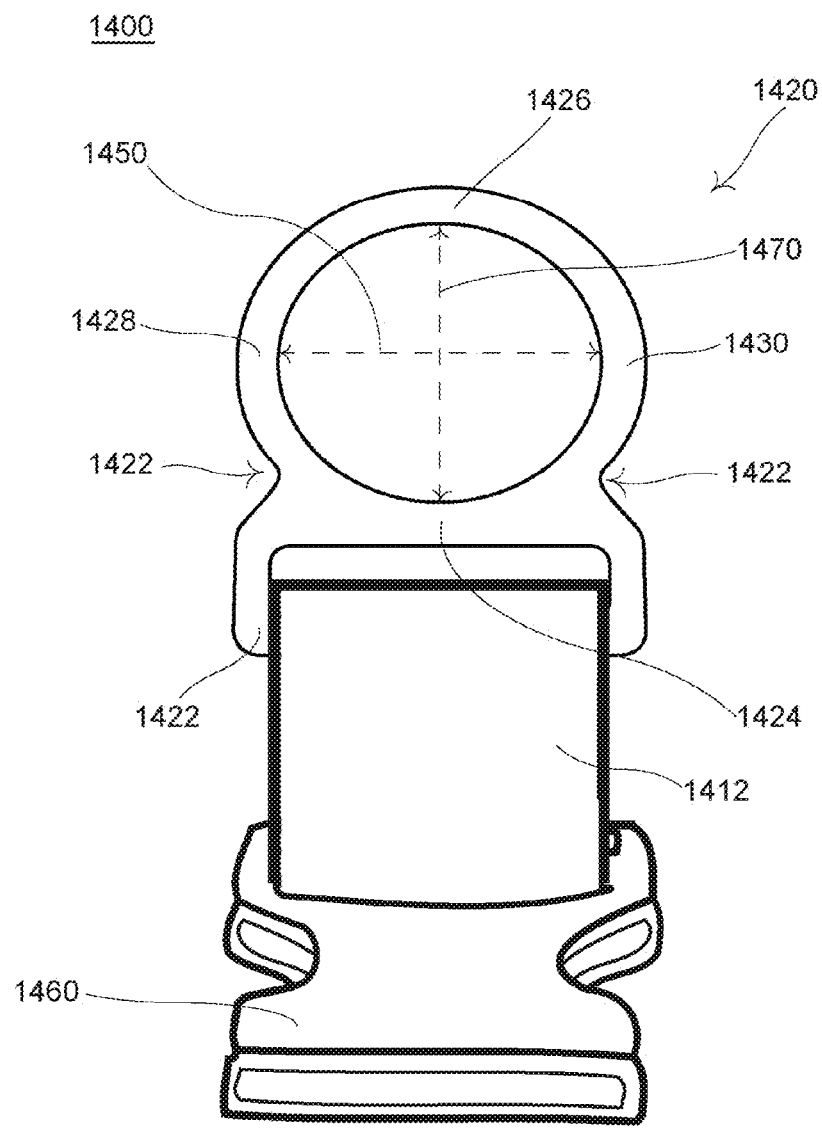
FIG. 14 is a front view of an embodiment of the present invention including the attachment mechanism and bottle opener of FIG. 13 attached to a collar or strap with a buckle, according to the seventh preferred embodiment of the present invention.

Referring now to FIG. 14, a front view 1400 of an embodiment of the present invention is provided and includes an attachment mechanism and bottle opener 1320 shown in FIG. 13 (referred to in this and FIGS. 15-17 as 1420) attached to a collar or strap 1412 that has a buckle portion 1412 attached to it, according to another embodiment of the present invention. The combination oval attachment member ring and bottle opener 1420, like 1320, may be very similar to the combination D-ring and bottle opener 1020 shown in FIG. 10, both not having a pry hook protruding inward into the hole or void that would be used to pry open a bottle cap from a bottle, without extending from the second (outer most) linking member 1426 (similar to the second linking member or hinge bar 26, though rounded) nor the intermediate linking member 1424 (similar to the intermediate linking member or pry hook 24, though rounded or curved on the inner side facing the bottle opening hole or void). In this configuration, the bottle opener may operate in the same or opposite manner as the combination D-ring and bottle opener 1020 to open a bottle. In a preferred manner, the intermediate linking member 1424 would be the pry bar and the second (outer most) linking member 1426 would be the hinge bar. As with the other D-ring shaped embodiments, one skilled in the art would appreciate that the oval loop may be used to attach, for example, a leash or ID tag thereto.

In this design, the combination attachment member and bottle opener 1420 may be, for example, a lower portion that is generally a flat rectangular shaped body on one side and an upper portion that is a rounded or oval shaped body opposite thereto and include two through holes or voids, having a first (right side) arm 1430 along one side (note that this embodiment does not include an intermediate shoulder feature, but could) extending vertically and a second (left side) arm 1428 arranged generally parallel to and opposite the first arm 1330 (note also that in this embodiment the second arm does not include its own intermediate shoulder feature, but could). The arms 1428 and 1430 may be separated by three linking members, one at the lower or proximal end of the arms 1428 and 1430 by a first linking member 1422 (mostly hidden behind strap or collar 1412), and at the upper or distal end by a second linking member or hinge bar end 1426, and by an intermediate linking or prying member 1424 somewhere in between the other two links, preferably closer to the first linking member 1422 than the second linking member 1426 so that a strap attachment hole or void may be a smaller size (area) and height than the bottle-opening hole or void. It is noteworthy that in this embodiment the second linking member 1426 may be rounded or curved acutely so as to reach downward toward the intermediate linking member 1424 so as to meet coincidentally the arms 1428 and 1430, and with the intermediate linking or prying member 1424 form an oval shape into which a bottle cap may be placed to be removed from a bottle.

The first linking member 1422, right arm 1430, intermediate link 1424, and the left arm 1428 border or form a void that may be the strap attachment hole or void, where a strap or collar 1412 may be threaded through so as to attach it thereto as shown in the figure. A strap or collar 1412 may be inserted through the strap attachment hole or void. This void or hole may receive, for example, a multi-layered strap such as a two-ply strap 1412 (similar to the one shown above in FIGS. 1, 2 and 7) or a single ply strap as illustrated in FIGS. 15-17, as similarly shown in FIG. 5 above for the previously described combination D-ring and bottle openers or as shown below in FIGS. 14-17. A buckle mechanism 1460, for example a female buckle assembly with hole, may be attached to the strap or collar 1416.

This design is similar to the previously described combination D-ring and bottle opener and varies primarily in the shape of the bottle opening hole or void being oval. This combination oval attachment mechanism and bottle opener 1420 may further include a bottle-opening portion or mostly oval shape consisting of the intermediate link or prying bar 1424 and a third linking member or hinge bar 1426, in conjunction with a portion of right arm 1430 and left arm 1428. This mostly oval shape structure is somewhat symmetrical, and as such one skilled in the art would appreciate that either the intermediate linking member 1424 or the second linking member 1426 may form or operate as the prying bar for inserting under the lip of a crimped on bottle lid and/or the hinge bar that passes over the top of the bottle lid so that a downward rotation of the opener 1420 relative to the bottle lid forces the bottle hinging or pry region (e.g., the region just above 1424) to lift up the overhanging portion of the crimped on lid, while the other operates as the hinge bar (e.g., 1424 or 1426) that restricts relative movement of the lid, thus forcing it open—as would be well understood in this art. The bottle opening length or width 1450 of the void or hole may be, for example, approximately 25-30 mm while the height 1470 may be, for example, approximately 10-20 mm. Ideally for the best leverage, the height 1470 may be made to be a length so that it sits on approximately the middle of the width of a bottle cap, for example, approximately 12-14 mm. Furthermore, one skilled in the art would appreciate that a round void or hole is not as practical or have the manner or ease of function desired unless a protruding pry hook is used on one of the intermediate link member 1424 or the second linking member 1426, because the bottle cap is round and must fit through at least the side areas 1428 and 1430. Although, this design may be in some ways superior to some of the other designs because there is no protruding pryhook anywhere. One limitation of this design compared to the new external pryhook design is that distance 1450 would be greater than a diameter of a bottle cap while distance 1470 would likely be less than the diameter of a bottle cap. However, it is best if the bottle cap does not fit through the intermediate link member 1424 and the second link member 1426 simultaneously so that the bottle opener will only over a closed bottle cap and bottle, rather than fit completely over the round bottle cap. As such, if the bottle opening hole or void is round, a protruding pry hook should be used so that both intermediate link member 1424 and the second link member 1426 do not simultaneously slip over the bottle cap. As illustrated for this embodiment in FIGS. 13-17, the size (area) and height of both through holes or voids may be closer to being the same than the other previously described embodiments that have a pry hook protruding into the bottle opening hole or void.

Although the intermediate link 1424 as shown is not particularly wide and is approximately the same width as the other linking and arm members, it may be increase in size to be of sufficient size (width) to enable a logo or other mark to be affixed thereon for marketing or promotional or other purposes such as to improve its prying strength (not shown). The corners of the opener 1420 may be rounded and the edges smoothed to prevent catching on various things, for example, animal fur or cutting tissue. Furthermore, although the various dimensions of the combination oval attachment member and bottle opener 1420 may be generally the same as those for combination D-ring bottle openers such as 920, similar to the combination D-ring and bottle opener 1020 in FIG. 10, the height of the bottle opening hole or void would likely be smaller because there is no pry hook protruding into the bottle opening hole or void bounded by the left arm 1428, right arm 1430, rounded second or hinge linking member 1426, and rounded intermediate or prying linking member 1424, for example, in the range of approximately 9-14 mm in length or height (widest dimension from the intermediate or third linking or pry bar member 1424 (without a pry hook) to the second linking member or hinge bar 1426).

As would be appreciated by one skilled in the art, the elimination of the pry hook for this embodiment may, in some orientation and use, may require more use of the strap or collar to pry off a bottle cap and less relative freedom or swing of the combination oval shaped ring or attachment mechanism and bottle opener 1420 such that the thickness may be larger, for example, approximately 2-4 mm or more and the width of the through hole or opening for a strap or collar may be smaller (relative to the strap or collar thickness). Further, one would appreciate that the width of the intermediate link or prying bar 1424 may be made wider so as to bolster its prying strength, for example, approximately 5-10 mm. And as shown in FIG. 13, the sides of the intermediate link or prying bar 1324 may be necessarily wider than that of a D-ring embodiment because of the oval shape to the bottle opening whole and relatively rectangular and rounded outer surface or geometric shape.

The combination D-ring or attachment mechanism and bottle opener 1420 may also be made using the same materials and methods as mentioned for the previously describe combination D-ring or attachment mechanism and bottle openers.

Referring now to FIG. 15, a perspective view 1500 of an embodiment of the present invention including the attachment mechanism and bottle opener 1420 of FIGS. 13 and 14 attached to a collar or strap 1412 with a female buckle portion 1460 attached to one end and a male buckle portion 1570 attached to the other end of the collar or strap 1412. The male buckle portion 1570 may be removably inserted into the female buckle portion 1460 to form a collar. In this view one can better appreciate how the strap or collar 1412 may be inserted into the smaller hole or void in the attachment mechanism and bottle opener 1420. FIG. 16 provides a side view the attachment mechanism and bottle opener 1420 attached to the collar or strap 1412 with a buckle portion (1460 and 1570) on each end, respectively, as in FIG. 15. In this figure one can better appreciate that the attachment mechanism and bottle opener 1420 may swing relatively freely to the right direction as shown by arched dotted line 1605 or left direction as shown by arched dotted line 1610 until it abuts or lays flat on the upper surface of the strap or collar 1412. Similarly, unless there is some restricting mechanism (e.g. stitching of another strap portion over the first linking member 1422, the attachment mechanism and bottle opener 1420 may slide freely along the strap or collar 1412 in either the right direction as shown by dotted line 1615 or the left direction as shown by dotted line 1620. FIG. 17 provides a top view of the oval attachment mechanism and bottle opener 1420 attached to a collar or strap 141 with a buckle portion 1460 and 1570 on each end. As would be appreciated by one skilled in the art, these illustrations are simplified to provide a quick understanding of how the strap or collar 1412, buckle portions 1460 and 1570, and attachment mechanism and bottle opener 1420 may cooperate with one another to form a collar or strap that may easily be used for attaching various items to the attachment mechanism and bottle opener 1420 while allowing the attachment mechanism and bottle opener 1420 to be removably attached and operable as a bottle opener whether coupled together as a collar around a neck or not. Further, the attachment mechanism and bottle opener 1420 may have cut outs on either side that look much like the shoulders in the other embodiments, so as to look more like an oval bottle opener through hole or void attached in the center to the smaller strap attachment rectangle through hole or void.

Referring now to FIGS. 18-25, another embodiment of the present invention is provided including a combination D-ring or attachment mechanism and bottle opener 1820 that may be coupled to a strap, collar, etc. In this embodiment the combination D-ring or attachment mechanism and bottle opener may be used in the place of or as a D-ring coupled to, for example, a dog collar, but may have a pry hook 1826 that is generally in a U-shape that protrudes outward from the generally planer frame of the combination D-ring or attachment mechanism and bottle opener 1820. FIG. 18 provides a perspective view of an even further embodiment of the present invention including an attachment mechanism or D-ring and bottle opener 1820, according to an at least one other preferred embodiment of the present invention.

The combination D-ring and bottle opener 1820 may be very similar to the combination D-ring and bottle opener 20 shown in FIG. 8, but having the pry hook region 1836 extending outward from the generally flat plane of the rest of the combination D-ring and bottle opener 1820 framework. As such, the overall frame of the combination D-ring and bottle opener 1820 may include in a single planar structure wherein the pry hook 1836 is not within the same plane as the second (outer most) linking member 1826 (second linking member or hinge bar 26) or the intermediate linking member 1824 (intermediate linking member or pry hook 24), but rather extends outwardly from the primary flat plane of combination D-ring and bottle opener 1820. In this configuration, the bottle opener would be able to be generally smaller while still operating as an attachment mechanism and bottle opener. The design may take the geometrical shape of a D-ring as shown in the various figures. However, one skilled in the art may appreciate that the shape may be various others such as an oval or generally rectangular (no rounded second (outer most) linking member.

In this particular design, the combination D-ring and bottle opener 1820 may be, for example, a generally flat rectilinear body in a lower half and curved radius in the upper half, having a first (right side) arm 1830 along one length, with intermediate shoulder feature 1842, extending vertically and a second (left) arm 1828 arranged generally parallel to the first arm and also including its own intermediate shoulder feature 1840. The arms may be separated by, for example, three linking members; at the lower or proximal end of the arms 1828 and 1830 a first linking member 1822, and at the upper or distal end a second linking member or hinge bar end 1826, and an intermediate linking member 1824 having a pry hook 1836 attached thereto. The intermediate linking member 1824 may be located somewhere in between the other two links, preferably closer to the first linking member 1822 than the second linking member 1826 so that a strap attachment hole or void (lower hole or void) is smaller than the bottle-opening hole or void (upper hole or void). The first linking member 1822, right arm 1830, intermediate link 1824, and the left arm 1828 border or form a void that is the strap attachment hole or void (the lower hole or void where a strap or collar may be threaded through). This void or hole may receive, for example, a multi-layered strap such as a two-ply strap 12 (similar to the one shown above in FIGS. 1, 2 and 7) or a single layer strap (similar to the one shown above in FIGS. 15-17), as similarly shown in FIG. 5 above for the previously described combination D-ring and bottle opener. The intermediate linking member 1824 may include a pry hook 1836 attached to it and protruding outward to the side of the planar surface of the arms 1828 and 1839 and the linking members 1822, 1824, and 1826, the pry hook being the only portion or part of the combination D-ring attachment member and bottle opener 1820 that is not co-planar with the other parts of the combination D-ring attachment member and bottle opener 1820. The pry hook 1836 may be connected at a lower side of the intermediate linking member 1824 and may have an arced portion and a straight portion that forms together a half a U shape.

The intermediate link 1824 may be of sufficient size (width) to enable a logo or other mark to be affixed thereon for marketing or promotional or other purposes. However, one skilled in the art would appreciate that having the pry hook connected to the center of the intermediate linking member 1824 would then require a logo of other mark to be located to one side of another of the pry hook 1836 or the outer face of the pry hook 1836. The corners of the opener 1820 may be rounded and the edges smoothed to prevent catching animal fur or cutting tissue. Of particular note, the radiussed pry feature of pry hook 1836 may be made smooth, arcuate and radiussed edges that flow into each other without any sharp features.

This combination D-ring and bottle opener 1820 may further include a bottle-opening portion consisting of the intermediate link 1824 with a pry hook 1836 connected to it and a second linking member or hinge bar 1826, in conjunction with a portion of right arm 1830 and left arm 1828. The pry hook 1836 protrudes to the side of the generally planar surface of the combination D-ring and bottle opener 1820 creating a gap 1850 that may be used to inserted the lip of a crimped on bottle lid between the pry hook's 1836 inner surface and the outer surface of the intermediate linking member 1824. As a result of this configuration the second linking member or hinge bar 1824 may be shorter to hit approximately the center of the bottle cap and the bottle lid does not need to fit into the hole or void in the bottle opening end of the device. Therefore, the combination D-ring and bottle opener 1820 may be made smaller in both width and height, making it useful for applications, for example on a small cat collar, which many of the other embodiments would be less appropriate for.

In operation, the combination D-ring and bottle opener 1820 may be, for example, be placed relatively flat on the top of a bottle cap with the hinge bar 1826 parallel and adjacent with the top of the bottle lid and the pry hook 1836 placed below the bottom of the bottle cap with the side of the bottle cap wedged into the gap 1850 between the pry hook 1836 and facing surface of the intermediate linking member 1824. In that manner, the bottle cap or lid may be removed from the bottle by a downward rotation of the opener 1820 relative to the bottle lid that thereby forces the bottle pry hook 1836 to lift up the overhanging portion of the crimped on lid, while the hinge bar 1826 restricts relative movement of the lid, thus forcing it open—as would be well understood in this art. As would be appreciated by one skilled in the art, the outward orientation of the pry hook 1836 for this embodiment may require more use of the strap or collar to pry off a bottle cap and less relative freedom or swing of the combination D-ring or attachment mechanism and bottle opener 1820 such that the thickness may be larger, for example, approximately 2-4 mm and the width of the through hole or opening for a strap or collar may be smaller (relative to the strap or collar thickness).

As noted above in this embodiments, it may be preferred that the design has been optimized to create the shortest overall length, as well as shortest standoff height (length that D-Ring stands off of collar), while still allowing operation of opening a bottle. Although the combination bottle opener/D-ring would work better as a bottle opener in a longer length, this would result in an increased probability that the device would snag on various things such as a dog's fur or an item the dog may encounter while moving around. Furthermore, a shorter design, although less-likely to snag, at some reduced size would be inoperable as an opener as the opening force would be impractically high (lacking much leverage). So the size of the combination D-ring (or attachment member) bottle opener is important to consider and should be optimized given these and other tradeoffs. In this particular embodiment the outward extending pry hook 1836 with gap 1850 makes it possible for the combination D-ring and bottle opener 1820 to be smaller in length and width so as to work well with narrower and/or thinner straps and collars.

Some possible dimensions for the combination D-ring and bottle opener 1820 for use with, for example, a small strap or cat collar may be, for example, a frame body (approximately 18-20 mm entire rectangular dimension) having an overall thickness of approximately about 1-3 mm, overall length of approximately 16-19 mm, opener/bottle cap area inside dimension of about 12-14 mm wide by approximately 6-8 mm in length or height (widest dimension from the intermediate or third linking member and/or pry hook bar 1824 to the second linking member or hinge bar 1826). The pry hook 1836 may have a length of approximately 1.5-6 mm and the strap or collar through hole or void may have a width of approximately a width of 15-17 mm and a height of approximately 15-22 mm. The width of the various linking members (1822, 1824, and 1826 and arm members 1828 and 1830 may be approximately 3-5 mm. As mentioned above, the dimensions selected are important to making sure that the combination D-ring and bottle opener 1820 works well both as a bottle opener, as a attachment mechanism (for E.g. attaching a leash), and with, for example, a small and/or narrow strap or cat collar, or other similar applications where the strap that the combination D-ring and bottle opener 1820 attaches to is relatively small such as 14-16 mm wide and 0.5-1.5 mm thick. The height of the pry hook 1836 may be in the range of approximately 1.5-5 mm, the width of the pry hook 1836 may be in the range of approximately 6 mm, and the thickness of the pry hook 1836 may be in the range of approximately 2-3 mm. The gap 1850 may be in the range of approximately 6.5-8.5 mm. One skilled in the art would appreciate that the design of the bottle opener may need to be modified in various applications. One notable point for this design is that there is no requirement of width 1828-1830 (like the oval design). But distance 1950+length of 1826 should not be larger than diameter of bottle cap. Otherwise, 1826 may not be used as a pry bar.

Although this combination attachment mechanism and bottle opener design works well for a small dog or cat collar, it will work for large animals too. For a large animal or dog collar the frame size would be approximately 20-28 mm and many of the other dimensions somewhat proportionally larger.

In this embodiment the combination D-ring and bottle opener 1820 may be made of a metal or similarly strong material, for example steel or stainless steel. In these preferred embodiments the combination D-ring and bottle opener 1820 may be fabricated in a stamping operation then put through a hardening process or molded. For strength purposes, the entire combination D-ring and bottle opener 1820 is made as an integral piece. However a similar strength may be achieved by bending and welding together various individual portions or pieces. Surface finishing may be done through hang-up plating with a rust inhibiting coating. Although in this embodiment the opener 1820 may be coated with a rust inhibiting material, other contemplated embodiment include using aluminum or stainless steel—some dimensions would be understood to be modified to provide the sufficient strength required to prevent the opener 1820 from bending and/or breaking when applied to open a bottle.

Figure 19:
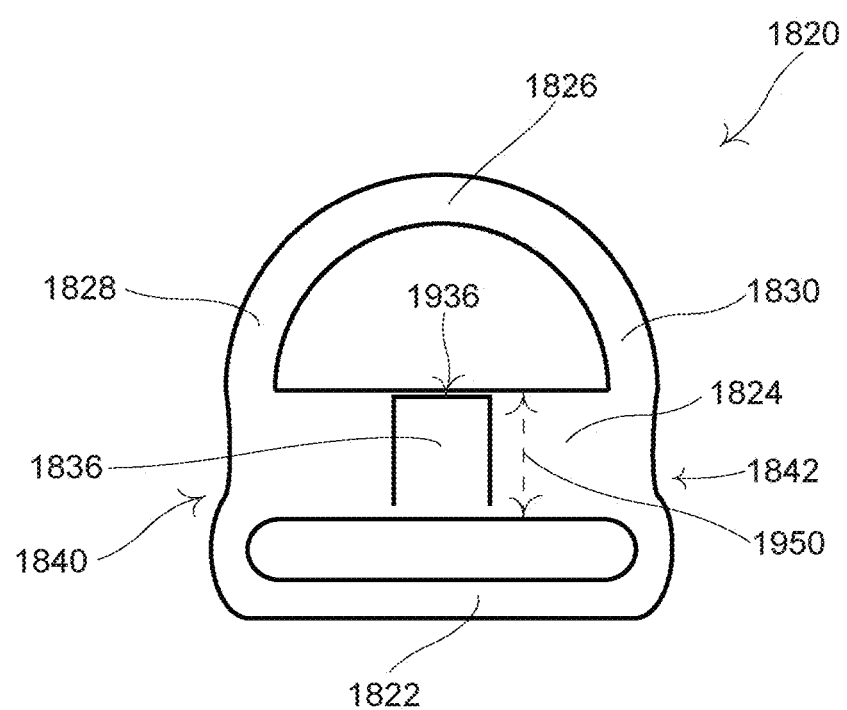
FIG. 19 is a front view of an even further embodiment of the present invention including a attachment mechanism or D-ring and bottle opener of FIG. 18, according to an at least eighth preferred embodiment of the present invention.

Referring now to FIG. 19, a front view of the attachment mechanism or D-ring and bottle opener 1820 of FIG. 18 is provided. As shown in this figure, the combination D-ring and bottle opener 1820 may be an approximate rectangular bottom half and a semi-circle upper half, so that it generally has a D-ring shape similar to many of the previously describe embodiments. The attachment mechanism or D-ring and bottle opener 1820 may have a first (right side) arm 1830 along one side length extending vertically, with an intermediate shoulder feature 1842, and a second (left) arm 1828 along one side length extending vertically, arranged generally parallel to the first arm 1830 and also including its own intermediate shoulder feature 1840. The arms 1828 and 1830 may be separated by, for example, three linking members; at the lower or proximal end of the arms 1828 and 1830 a first linking member 1822, and at the upper or distal end a second linking member or hinge bar end 1826, and an intermediate linking member 1824 having a pry hook 1836 attached thereto. The pry hook 1836 may have an end 1936 that is approximately coincident with the lower edge of an attachment and bottle opening void or hole bounded by the intermediate linking member 1824 and the second linking member 1826. The second linking member may be a semi-circle or rounded member that may operate as the hinge arm of the bottle opening portion of the attachment mechanism or D-ring and bottle opener 1820. In this embodiment the hole or void in the upper half is primarily for attaching things thereto, such as a leash, ID tag, chain, rope, etc.

The intermediate linking member 1824 in this embodiment may be relatively high or tall so as to accommodate the height or length of the pry hook 1839. The intermediate linking member 1824 may be located somewhere in between the other two links, preferably closer to the first linking member 1822 than the second linking member 1826 so that a strap attachment hole or void (lower hole or void) is smaller than the attachment hole or void (upper hole or void located in the bottle-opening area). The first linking member 1822, right arm 1830, intermediate link 1824, and the left arm 1828 border or form a void that is the strap attachment hole or void (the lower hole or void where a strap or collar may be threaded through). This void or hole may receive, for example, a multi-layered strap such as a two-ply strap 12 (similar to the one shown above in FIGS. 1, 2 and 7) or a single layer strap (similar to the one shown above in FIGS. 15-17), as similarly shown in FIG. 5 above for the previously described combination D-ring and bottle opener. In this figure it is clear that the attachment hole or void has a larger area and more height than that of the strap attachment hole or void, it is approximately two times as large (even though the width is smaller). The intermediate linking member 1824 may include a pry hook 1836 attached to it and extending from one side (upper side) of the intermediate linking member 1824 to the other side (lower side) of the intermediate linking member 1824 having a length 1950 that is bigger or taller than most other intermediate linking member in the previously discussed embodiments. This larger size may help accommodate the top side of a bottle cap so as to sandwich it between the outer surface of the bottle opening area and the inside surface of the pry hook 1836 (i.e., the gap area 1850). It is important to set the gap depth 1850 to be able to fit a bottle cap height. but the length of arm 1836 may be as short as 1.5 mm. As noted before, the pry hook being the only portion or part of the combination D-ring attachment member and bottle opener 1820 that is not co-planar with the other parts of the combination D-ring attachment member and bottle opener 1820. The pry hook 1836 may be connected to a lower side of the intermediate linking member 1824 and may be located at or near the center length of the intermediate member 1824.

Figure 20:
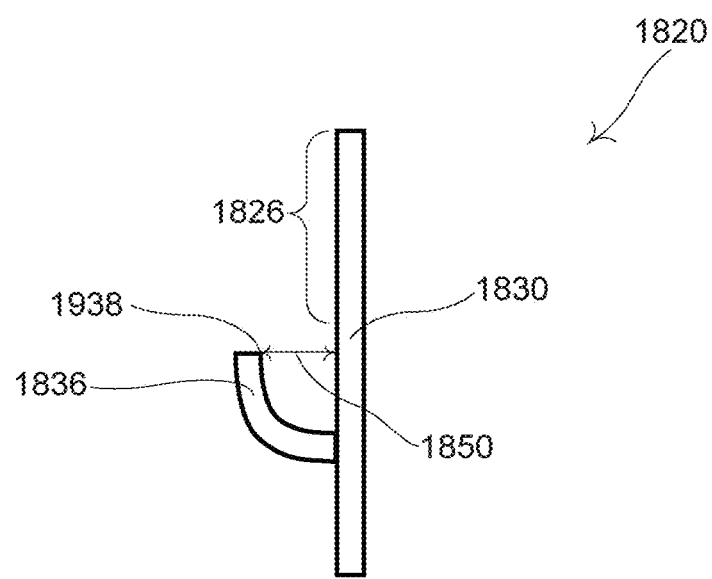
FIG. 20 is a side view of an even further embodiment of the present invention including a attachment mechanism or D-ring and bottle opener of FIG. 18, according to an at least eighth preferred embodiment of the present invention.

Referring now to FIG. 20, a side view of the attachment mechanism or D-ring and bottle opener 1820 of FIG. 18 is provided according to an at least one embodiment of the present invention. The right side arm 1830 is shown having an elongated thin area that extends from the bottom of the attachment mechanism or D-ring and bottle opener 1820 up to the second linking member area 1826 (a circular or curved member (e.g. a semicircle or smaller) that may be integrally made with the right side arm 1830 (as shown) or as separate pieces). The pry hook 1836 is connected to and extends to the left (or right being symmetrical) side of the right side arm 1830, and may be formed approximately in the shape of half of a "U" and have a gap 1850 therebetween for accommodating the thickness of a crimped edge of a standard bottle cap. Again the pry hook 1836 and right side arm 1830 may be made integrally (as shown) or as separate pieces.

Figure 21:
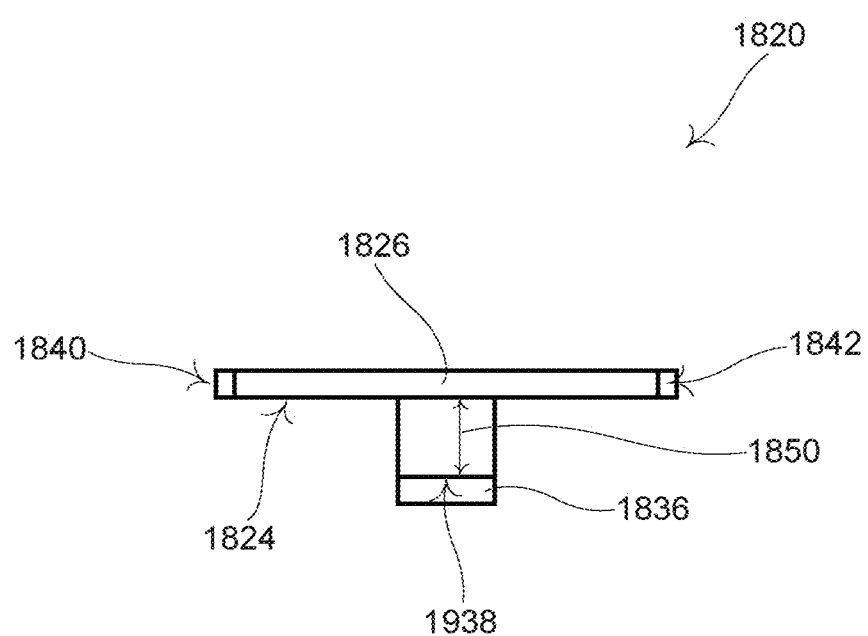
FIG. 21 is a top view of an even further embodiment of the present invention including a attachment mechanism or D-ring and bottle opener of FIG. 18, according to an at least eighth preferred embodiment of the present invention.

Referring to FIG. 21, a top view of an attachment mechanism or D-ring and bottle opener 1820 of FIG. 18 is further provided. In this view, one can see the second linking member or hinge bar 1826 is long and narrow and has shoulders 1840 and 1842 on either side of it. The pry hook 1836 is spaced away by gap 1850 from the outer primary front surface of the second linking member or hinge bar 1826 and intermediate linking member 1824 (not shown).

Figure 22:
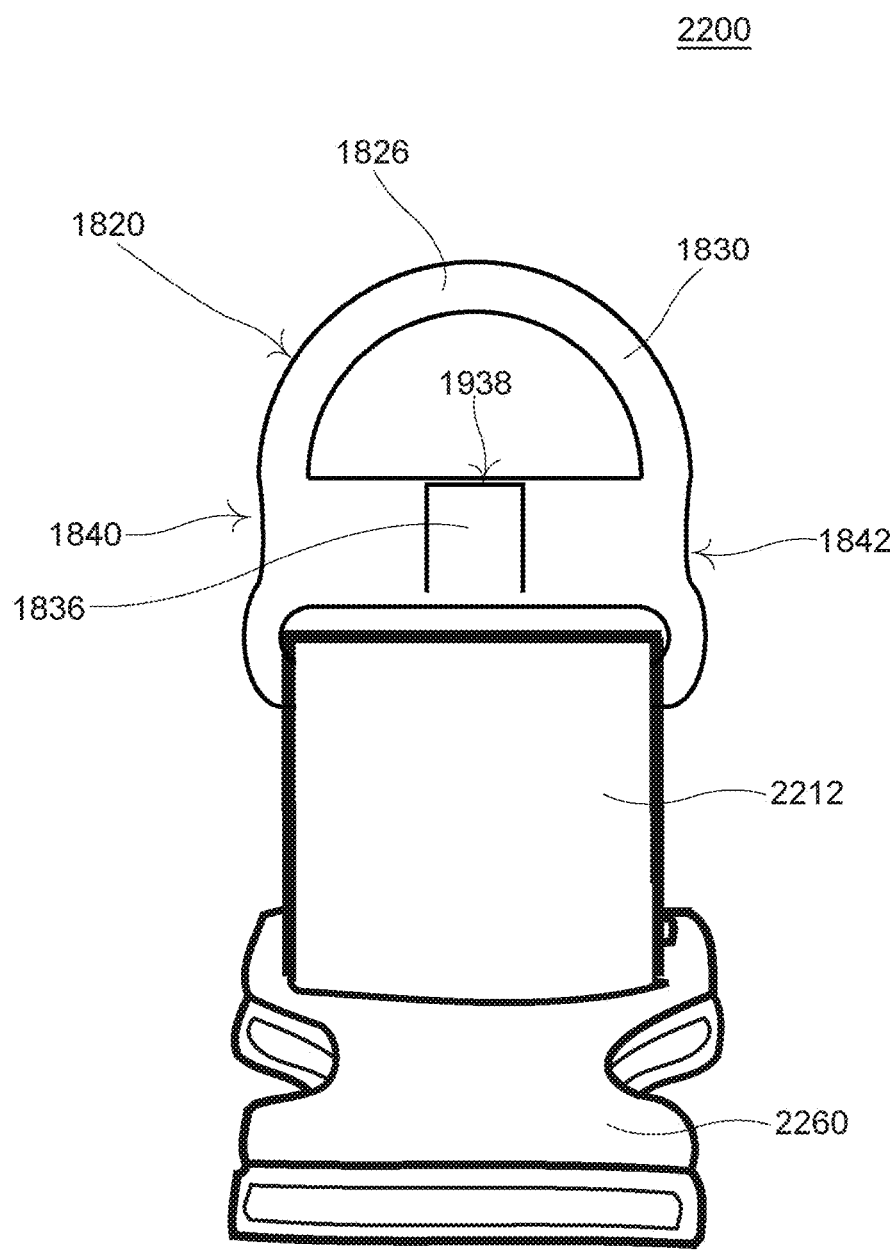
FIG. 22 is a front view of an embodiment of the present invention including the attachment mechanism and bottle opener of FIG. 18 attached to a collar or strap with a buckle, according to the at least eighth preferred embodiment of the present invention.

Referring now to FIGS. 22-25, the device 2200 may include an attachment mechanism or D-ring and bottle opener 1820 is shown with a strap or collar 2212 inserted through the strap or collar hole or void. FIG. 22 provides a front view of an embodiment of the present invention including the attachment mechanism and bottle opener 1820 of FIG. 18 as it may be attached to a collar or strap having, for example, a buckle or connector 2260, according to a still further embodiment of the present invention. The connector 2260 may be connected to one end of the strap or collar 2212 and may be either a male or a female connector, but as shown here is a female connector 2260. This female connector 2260 may be connected to a corresponding male connect (see FIG. 23) that may be attached to another portion of the strap or collar 2212 so as to form a circular collar around the neck of, for example, a pet such as a cat. Alternatively, the female connector 2260 may be connected to a corresponding male connector that is attached to some other article and might not be used as a collar. In either case the attachment mechanism or D-ring and bottle opener 1820 is attached to the strap or collar 2212 material such that its primary planar axis is oriented so as to be perpendicular with the major lateral axis of the strap or collar 2212, because it will give a user the opportunity to easily remove the cap on a bottle without twisting or removing the attachment mechanism or D-ring and bottle opener 1820 from the strap or collar.

Figure 23:
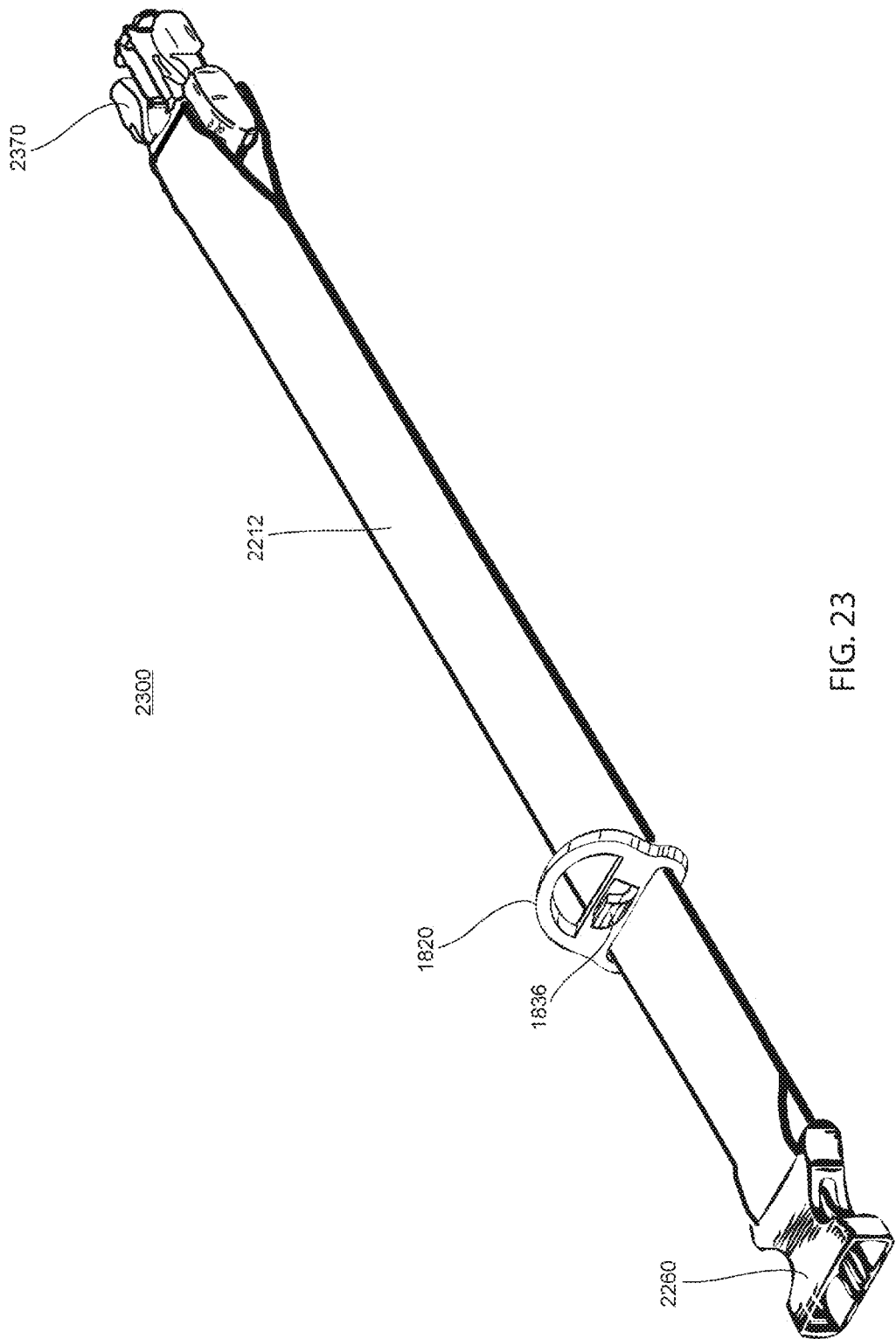
FIG. 23 is a perspective view of an embodiment of the present invention including the attachment mechanism and bottle opener of FIG. 18 attached to a collar or strap with a buckle portion on each end, according to a preferred embodiment of the present invention.

FIG. 23 is a perspective view 2300 of an the attachment mechanism and bottle opener 1820 of FIG. 18 attached to a collar or strap 2212 with a buckle portion 2260 and 2370 on each end. As can be seen, the pry hook 1836 protrudes to the front of the attachment mechanism or D-ring and bottle opener 1820. The attachment mechanism or D-ring and bottle opener 1820 has the strap or collar 2212 threaded through the lower hole or void in the attachment mechanism or D-ring and bottle opener 1820. A female buckle portion 2260 and male buckle portion 2370 may be attached to opposite ends of the strap or collar 2212. The male buckle portion 2370 may be removably inserted into the female buckle portion 2260 to form a collar. In this view one can better appreciate how the strap or collar 2212 may be inserted into the smaller hole or void in the attachment mechanism or D-ring and bottle opener 1820.

Figure 24:
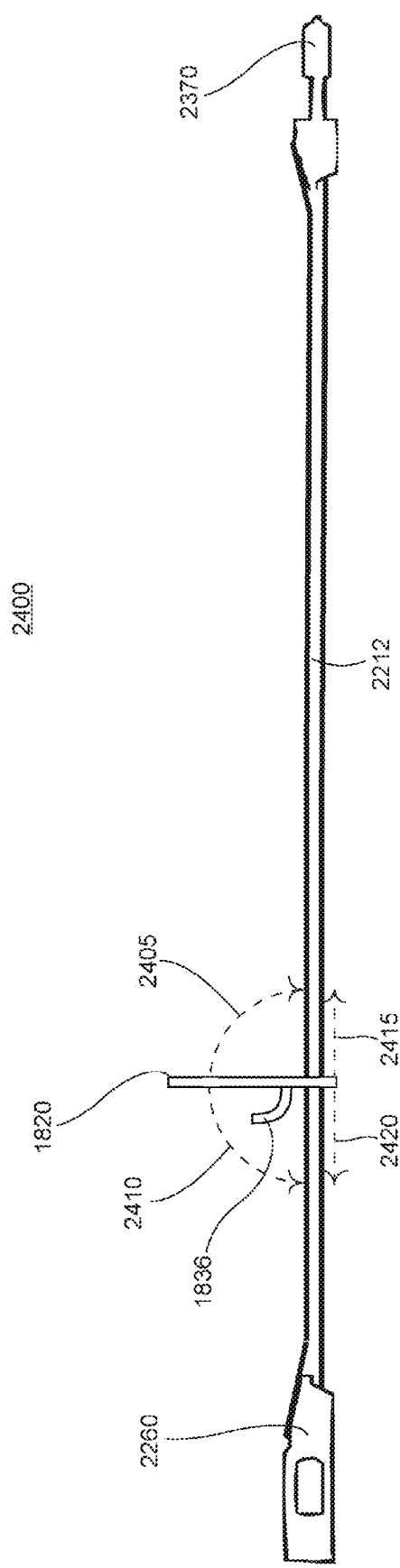
FIG. 24 is a side view of an embodiment of the present invention including the attachment mechanism and bottle opener attached to a collar or strap with a buckle portion on each end as in FIG. 18, according to a preferred embodiment of the present invention.

FIG. 24 provides a side view 2400 of the attachment mechanism or D-ring and bottle opener 1820 attached to the collar or strap 2212 with a buckle portion (2260 and 2370) on each end, respectively, as in FIG. 23. In this figure one can better appreciate that the attachment mechanism and bottle opener 1820 may swing relatively freely to the right direction as shown by arched dotted line 2405 or left direction as shown by arched dotted line 2410 until it abuts or lays flat on the upper surface of the strap or collar 2212. Similarly, unless there is some restricting mechanism (e.g. stitching of another strap portion over the first linking member 1822), the attachment mechanism and bottle opener 1820 may slide freely along the strap or collar 2212 in either the right direction as shown by dotted line 2415 or the left direction as shown by dotted line 2420.

Figure 25:
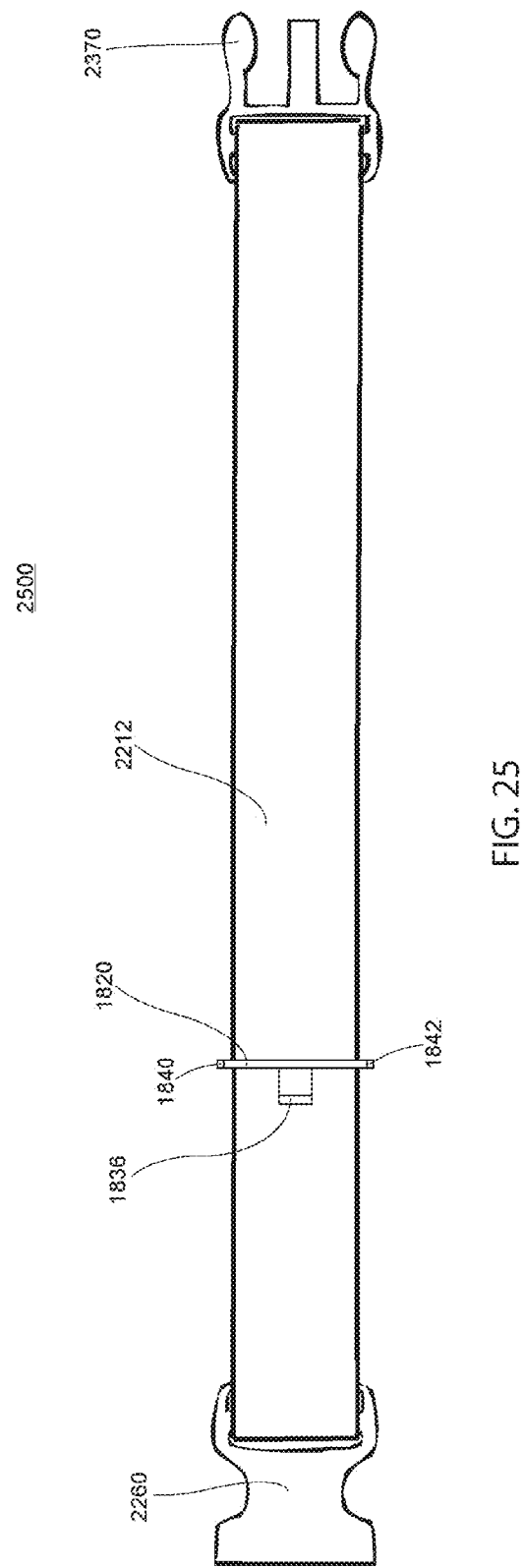
FIG. 25 is a top view of an embodiment of the present invention including the attachment mechanism and bottle opener attached to a collar or strap with a buckle portion on each end as in FIG. 18, according to a preferred embodiment of the present invention.

FIG. 25 provides a top view of the attachment mechanism or D-ring and bottle opener 1820 attached to a collar or strap 2212 with a buckle portion 2260 and 2370 on each end. As would be appreciated by one skilled in the art, these illustrations are simplified to provide a quick understanding of how the strap or collar 2212, buckle portions 2260 and 2370, and attachment mechanism or D-ring and bottle opener 1820 may cooperate with one another to form a collar or strap that may easily be used for attaching various items to the attachment mechanism or D-ring and bottle opener 1820 while allowing the attachment mechanism and bottle opener 1820 to be removably attached and operable as a bottle opener whether coupled together as a collar around a neck or not. Further, the attachment mechanism or D-ring and bottle opener 1820 may have shoulders 1840 and 1842 as in many of the other embodiments.

As noted above, with this particular embodiment the or attachment mechanism or D-ring and bottle opener 1820 may be made smaller than the other embodiments yet be an effective attachment mechanism (for example to attach a leash or pet ID tag) and be very useful for various of applications, for example, for us on smaller collars used with pets such as cats, hamsters, rabbits, etc., as an attachment mechanism for a pet harness, or as a wrist band or ankle band for a person. As such, this embodiment expands upon the previous embodiments to give flexibility of applications not previously anticipated. A few exemplary applications for the attachment mechanism or D-ring and bottle opener 1820 follow.

Figure 26:
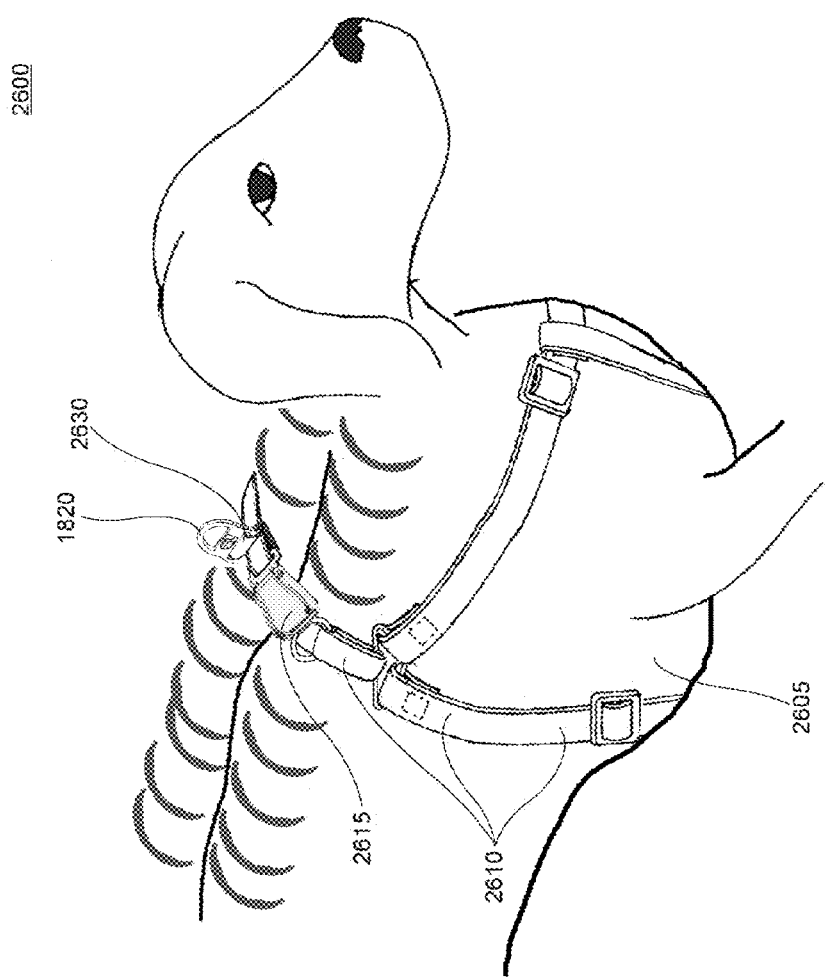
FIG. 26 is a perspective view of an embodiment of the present invention including the attachment mechanism and bottle opener of FIG. 18 attached to a harness with a buckle portion, according to a preferred embodiment of the present invention.

FIG. 26 provides a perspective view 2600 of an embodiment of the present invention including the attachment mechanism or D-ring and bottle opener 1820 of FIG. 18 attached to a harness 2610 with a buckle portion 2615 similar to an airline seat buckle, according to one exemplary embodiment of the present invention. The buckle portion 2615 may be, for example, the buckle that is discloses and patent in U.S. Pat. No. 8,984,725 issued on Mar. 24, 2015, application Ser. No. 13/180,374; which is incorporated herein in its entirety by reference for all purposes. In this embodiment the attachment mechanism or D-ring and bottle opener 1820 is attached in a perpendicular orientation to the lengthwise axis of one of the straps of the harness 2610. Although this harness is shown as being on a dog 2605, one skilled in the art would understand that attachment mechanism or D-ring and bottle opener 1820 may be even better suited for a smaller pet harness, for example, a miniature dog, a cat, a rabbit, a hamster, an iguana, etc. In any case, the attachment mechanism or D-ring and bottle opener 1820 would serve well as a leash attachment mechanism and bottle opener in this particular application. However, with larger pets such as a large dog, it may be best to use one of the earlier presented attachment mechanism or D-ring and bottle openers instead of the attachment mechanism or D-ring and bottle opener 1820.

Figure 27:
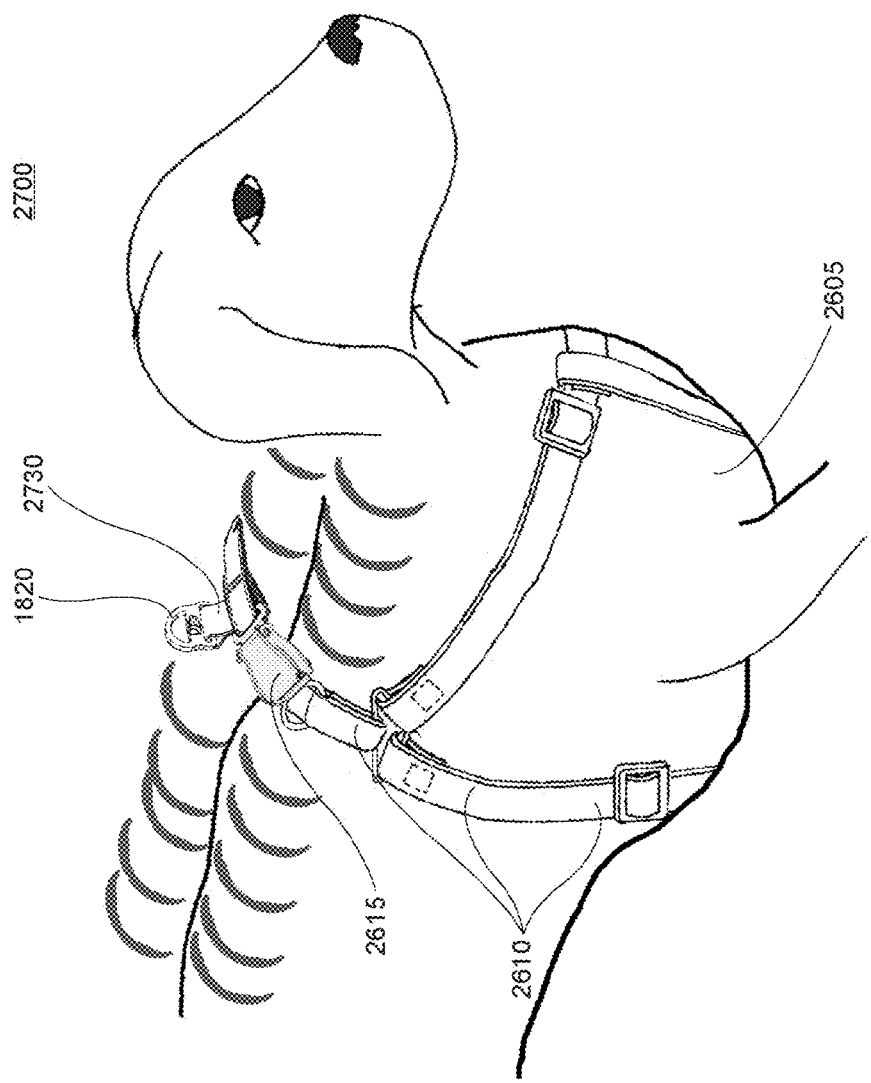
FIG. 27 is a perspective view of another embodiment of the present invention including the attachment mechanism and bottle opener of FIG. 18 attached to a harness with a buckle portion, according to a preferred embodiment of the present invention.

FIG. 27 provides a perspective view 2700 of an embodiment of the present invention including the attachment mechanism or D-ring and bottle opener 1820 of FIG. 18 attached to a harness 2610 with a buckle portion 2615 similar to an airline seat buckle, according to one exemplary embodiment of the present invention. In this embodiment the attachment mechanism or D-ring and bottle opener 1820 is attached in parallel orientation to the lengthwise axis of one of the straps of the harness 2610. This may be achieve by including an attachment mechanism or D-ring and bottle opener 1820 to harness 2610 connection strap 2730. Although this harness is shown as being on a dog 2605, one skilled in the art would understand that attachment mechanism or D-ring and bottle opener 1820 may be even better suited for a smaller pet harness, for example, one for a miniature dog, a cat, a rabbit, a hamster, an iguana, etc. In any case, the attachment mechanism or D-ring and bottle opener 1820 would serve well as a leash attachment mechanism and bottle opener in this particular application. However, with larger pets such as a large dog, it may be best to use one of the earlier presented attachment mechanism or D-ring and bottle openers instead of the attachment mechanism or D-ring and bottle opener 1820.

FIG. 28 shows a perspective view 2800 of an embodiment of the present invention including the attachment mechanism and bottle opener 1820 of FIG. 18 attached to a bag or back pack, according to an exemplary embodiment of the present invention. In this application, the attachment mechanism or D-ring and bottle opener 1820 may be attached to a personal bag or back pack 2805 onto, for example, a shoulder strap 2825 via a strap 2830. The bottom of the shoulder straps 2825 and 2835 may be adjustably connected to the lower part of the bag or back pack 2805 using a slider mechanism 2810 and 2815, respectively, attached to straps 2840 and 2845, respectively, that may be sewn onto the bag or back pack 2805. The slider may be, for example, the slider disclosed in U.S. Pat. No. 9,027,515 issued on May 12, 2015, application Ser. No. 13/606,595, which is hereby incorporated herein in its entirety for all purposes. In any case, the attachment mechanism or D-ring and bottle opener 1820 may be attached to the shoulder strap 2825 via a separate strap 2830. One would appreciate that the attachment mechanism or D-ring and bottle opener 1820 may be attached to the bag or back pack 2805 via one of straps 2840 or 2845, for example, sewn onto the end of the strap 2840 or riding freely to a portion of strap 2840 between the bag or back pack 2805 and the slider 2810.

FIG. 29 shows a perspective view 2900 of an embodiment of the present invention including the attachment mechanism or D-ring and bottle opener 1820 of FIG. 18 attached to a harness 2610 with a buckle portion 2615 and side or back pack 2920, according to another exemplary embodiment of the present invention. This embodiment is similar to the embodiment in FIG. 26, and as such the discussion of FIG. 26 applies equally to this embodiment. However in this embodiment a side or back pack 2920 is added. In this case, the side or back pack 2920 may include therein a bottle with a sealed pop off cap that the attachment mechanism or D-ring and bottle opener 1820 may be used to remove form the bottle. Although this embodiment shows the attachment mechanism or D-ring and bottle opener 1820 connected to the harness 2610, it may be preferable, for example, to connect it directly to the side or back pack 2920 via another separate strap that might be used to latch the side or back pack 2920 closed. Further the side or back pack 2920 may be oriented on top of the dog 2605 and harness 2610, and the attachment mechanism or D-ring and bottle opener 1820 attached on the top of the back pack 2920 so as to be useful as, for example, a leash attachment or D-ring mechanism for the harness while being conveniently close to the back pack 2920 in which a capped bottle needing opened may be kept. In addition, in this figure only on back pack 2920 is shown. However, one skilled in the art would appreciate that there may be more than one back pack, for example two back packs each on one side of the harness 2610.

The various different geometry embodiments of the attachment mechanism, bottle opener, and strap or collars shown in FIGS. 9-29 may also be made using the same materials and methods as mentioned for the previously describe combination D-ring or attachment mechanism, bottle openers, collars and straps shown in FIGS. 1-8. The various back packs and saddle bags may be made using materials and methods well know in the art or some of the recycled materials and methods of manufacture therefore mentioned herein.

Although the preferred embodiments of the present invention disclosed herein discuss utilizing thread interwoven as the means for mechanically fastening overlapping ends of the strap or the two plies of the strap, other well understood mechanical fastening or chemical fastening methods and devices are also contemplated including, for example, riveting, and gluing.

Although the invention has been particularly shown and described with reference to certain embodiments, it will be understood by those skilled in the art that various changes in form and detail may be made without departing from the spirit and scope of the invention.

The invention claimed is:

1. A strap or collar, comprising:
  a strap; and
  a bottle opener coupled to the strap, the bottle opener comprising:
    a main frame portion that is approximately planar and having a first opening and a second opening being adjacent to one another and sharing a first cross member, the first opening being bounded by a second cross member opposite the first cross member and the second opening being bounded by a third cross member;
    a pry hook formed from a punch out of and connected to the first cross member so as to leave a third opening in the first cross member, and the pry hook protruding outward from the approximately planar main frame, the pry hook cooperating with the third cross member in opening a bottle;
  wherein the strap is fixedly attached to the bottle opener through the first opening and at least the second opening height is smaller than a diameter of a bottle cap so that the third cross member abuts the top of a bottle cap when opening a bottle.

2. The strap or collar according to claim 1, wherein the bottle opener first cross member and third cross member couple with two side members to form a D-ring, and the D-ring is securely attached to the strap in an orientation parallel to a main surface of the strap so that a bottle may be opened without twisting the strap when the strap is around the neck of a wearer.

3. The strap or collar according to claim 1, wherein the third cross member is curved.

4. The strap or collar according to claim 1, wherein the first cross member is taller than the second cross member and the third cross member.

5. The strap or collar according to claim 1, wherein the pry hook is in half U shape, half V shape or an L shape.

6. The strap or collar according to claim 1, wherein the bottle opener has a third opening that is located adjacent to the pry hook, and the first opening is smaller than the second opening and the third opening is smaller than the first opening.

7. The strap or collar according to claim 1, wherein the first opening is smaller than the second opening, and the second opening is approximately a semi-circular shape.

8. The strap or collar according to claim 1, wherein the bottle opener is a combination bottle opener and attachment mechanism that has a planar height of approximately 15-22 mm and a width of approximately 14-17 mm.

9. The strap or collar according to claim 1, further comprising a harness, wherein the bottle opener is connect via the strap to a shoulder strap of the harness integral to a backpack or one of a plurality of interconnected straps of the harness with one or more pouches.

10. An apparatus, comprising:
    a strap; and
    a bottle opener coupled to the strap, the bottle opener comprising:
        a first smaller opening;
        a second larger opening; and
        the first smaller opening and the second larger opening being adjacent to one another and sharing a first cross member, the first smaller opening being bounded by a second cross member opposite the first cross member and the second larger opening being bounded by a third cross member for cooperating with the first cross member in opening a bottle;
    wherein the third cross member has a first wall that faces and is adjacent to the second larger opening, and a second wall, opposite the first wall, that is open to the outside and unbounded by further structure; and
    wherein the strap is fixedly attached to the bottle opener through only the first smaller opening, such that a clip may be attached to and move freely on the third cross member without being obstructed by the strap or any further structure.

11. The apparatus according to claim 10, wherein the third cross member includes a pry hook section with a pry hook.

12. The apparatus according to claim 11, wherein the pry hook protrudes into the second opening.

13. The apparatus according to claim 12, wherein the bottle opener is a combination bottle opener and attachment member having a D shape.

14. The apparatus according to claim 10, wherein the second cross member includes a pry hook formed in one side of the second cross member that does not protrude into the second larger opening.

15. The apparatus according to claim 10, wherein the second larger opening is formed in the shape of an oval and of dimension such that a bottle cap will fit into the second larger opening in a larger diameter axis direction but will not fit into the second larger opening in a smaller diameter direction of the oval shape.

16. The apparatus according to claim 10, further comprising a harness including a plurality of interconnected straps, wherein the strap is connected to at least one of the plurality of interconnected straps.

17. The apparatus according to claim 10, further comprising a harness including a plurality of interconnected straps, wherein the strap is connected parallel with or perpendicular to at least one of the plurality of interconnected straps.

18. A combination bottle opener and attachment member with strap, comprising:
    a strap; and
    a bottle opener and attachment member having a first rectangular opening and a second oval opening that share a first cross member, wherein the bottle opener is connected to the strap via only the first rectangular opening and the second oval opening has dimensions so that it will remove a bottle cap from a bottle.

19. The combination bottle opener and attachment member with strap according to claim 18, wherein the oval opening is larger than the rectangular opening and the oval opening has dimensions such that a bottle cap will fit into the oval opening in a larger diameter axis direction but will not fit into the oval opening in a smaller diameter direction.

20. The combination bottle opener and attachment member with strap according to claim 18, further comprising:
    a first buckle mechanism coupled to a first area of the strap; and
    a second buckle mechanism coupled to a second area of the strap, wherein the combination bottle opener and attachment member is coupled to a third area of the strap and the first buckle mechanism and second buckle mechanism may be coupled together so that the strap and buckle mechanisms form a collar, and wherein the second oval opening is formed of dimension such that a bottle cap will fit into the opening in a larger diameter axis direction but will not fit into the second larger opening in a smaller diameter direction of the oval shape.

* * * * *